US012275155B2

(12) United States Patent
Ichimaru et al.

(10) Patent No.: US 12,275,155 B2
(45) Date of Patent: Apr. 15, 2025

(54) CONTROLLER FOR DISTRIBUTED DEVICES

(71) Applicant: KABUSHIKI KAISHA YASKAWA DENKI, Kitakyushu (JP)

(72) Inventors: Yuji Ichimaru, Fukuoka (JP); Yukio Hashiguchi, Fukuoka (JP); Koichi Kuwahara, Fukuoka (JP)

(*) Notice: Subject to any disclaimer, the term of this patent is extended or adjusted under 35 U.S.C. 154(b) by 839 days.

(21) Appl. No.: 17/099,779

(22) Filed: Nov. 17, 2020

(65) Prior Publication Data
US 2021/0154849 A1 May 27, 2021

(30) Foreign Application Priority Data
Nov. 27, 2019 (JP) .................. 2019-214790

(51) Int. Cl.
*B25J 9/16* (2006.01)
*B25J 9/00* (2006.01)
*G05B 19/4155* (2006.01)

(52) U.S. Cl.
CPC .......... *B25J 9/1682* (2013.01); *B25J 9/0093* (2013.01); *B25J 9/162* (2013.01); *G05B 19/4155* (2013.01);
(Continued)

(58) Field of Classification Search
CPC ........ B25J 9/1682; B25J 9/0093; B25J 9/162; B25J 9/161; B25J 9/1656; B25J 9/1661;
(Continued)

(56) References Cited

U.S. PATENT DOCUMENTS 5,831,851 A * 11/1998 Eastburn .......... G05B 19/41855
700/114
6,256,550 B1 * 7/2001 Wu .................... G06Q 10/0633
700/121
(Continued)

FOREIGN PATENT DOCUMENTS

CN 1917986 2/2007
CN 109388098 2/2019
(Continued)

OTHER PUBLICATIONS

Office Action issued in Korean Patent Application No. 10-2020-0158857 dated Dec. 14, 2021 (with English partial translation).
(Continued)

*Primary Examiner* — Thomas C Lee
*Assistant Examiner* — Tyler Dean Hedrick
(74) *Attorney, Agent, or Firm* — SOEI PATENT & LAW FIRM

(57) ABSTRACT

The control system includes: a plurality of controllers that respectively control a plurality of devices including at least robots; and an environment manager that is communicable with the plurality of controllers. The environment manager includes an environment information storage that stores environment information, and an information update unit that updates environment information according to an operation of the plurality of devices. Each of the plurality of controllers includes a condition monitor that monitors whether environment information stored in the environment device storage satisfies a predetermined condition and an operation execution unit that controls a corresponding device of the plurality of devices to execute a predetermined operation in a case where the environment information satisfies a predetermined condition.

21 Claims, 12 Drawing Sheets

(52) U.S. Cl.
CPC .............. *G05B 2219/31008* (2013.01); *G05B 2219/39427* (2013.01)

(58) Field of Classification Search
CPC ........ B25J 13/00; B25J 9/1602; B25J 9/1689; B25J 13/006; G05B 19/4155; G05B 2219/31008; G05B 2219/39427; G05B 19/41815; G05B 2219/31076; G05B 2219/39102; G05B 2219/39118; G05B 2219/40417; G05B 19/4183; G05B 19/04; G05B 19/41875; G05B 19/41885; Y02P 90/02; G05D 1/0088
See application file for complete search history.

(56) References Cited

U.S. PATENT DOCUMENTS

| | | | |
|---|---|---|---|
| 6,463,360 | B1 | 10/2002 | Terada et al. |
| 7,092,779 | B1 * | 8/2006 | Conboy ............ H01L 21/67276 |
| | | | 700/115 |
| 2003/0093174 | A1 * | 5/2003 | Nikulin ............ G05B 19/41885 |
| | | | 700/121 |
| 2004/0143486 | A1 * | 7/2004 | Yeow ................... G06Q 10/087 |
| | | | 705/28 |
| 2007/0007924 | A1 | 1/2007 | Nishihara et al. |
| 2011/0166703 | A1 | 7/2011 | Byrne |
| 2014/0046719 | A1 | 2/2014 | DeTitta |
| 2016/0067864 | A1 | 3/2016 | Mullan et al. |
| 2016/0151916 | A1 | 6/2016 | Kanno et al. |
| 2018/0046169 | A1 * | 2/2018 | Shimamura ............... G06T 7/70 |
| 2018/0173576 | A1 * | 6/2018 | Muro ............... G06Q 10/06311 |
| 2018/0250831 | A1 | 9/2018 | Hashimoto et al. |
| 2018/0264649 | A1 | 9/2018 | Ojima et al. |
| 2019/0047146 | A1 | 2/2019 | Oya et al. |
| 2019/0221037 | A1 | 7/2019 | Sugaya |
| 2019/0279259 | A1 * | 9/2019 | DeTitta .............. G06Q 30/0273 |
| 2020/0047339 | A1 | 2/2020 | Sawada et al. |

FOREIGN PATENT DOCUMENTS

| | | |
|---|---|---|
| CN | 110058570 | 7/2019 |
| JP | H8-166809 | 6/1996 |
| JP | H11-104984 | 4/1999 |
| JP | 2002-254373 | 9/2002 |
| JP | 2003-311661 | 11/2003 |
| JP | 2005-111637 | 4/2005 |
| JP | 2005-319526 | 11/2005 |
| JP | 2007-015055 | 1/2007 |
| JP | 2007-515305 | 6/2007 |
| JP | 2010-131705 | 6/2010 |
| JP | 2016-107349 | 6/2016 |
| JP | 2018-153881 | 10/2018 |
| JP | 2019-081204 | 5/2019 |
| KR | 10-2018-0025815 | 3/2018 |
| WO | 2005/063454 | 7/2005 |
| WO | 2017/033376 | 3/2017 |
| WO | 2018/194094 | 10/2018 |

OTHER PUBLICATIONS

Office Action issued in Korean Patent Application No. 10-2020-0158857, dated Oct. 4, 2022 (with English partial translation).
Extended Search Report in corresponding European Application No. 20208919.9, dated Apr. 23, 2021.
Office Action issued in Korean Patent Application No. 10-2020-0158857, dated Jun. 10, 2022 (with English partial translation).
Office Action issued in Indian Patent Application No. 202044050496, dated Apr. 19, 2022.
Office Action issued in Japanese Patent Application No. P2020-141013, dated Jun. 6, 2023 (with English partial translation).
Office Action issued in Japanese Patent Application No. P2019-214790, dated Feb. 4, 2020 (with English partial translation).
Office Action issued in Chinese Patent Application No. 202011293967.5, dated Mar. 25, 2024 (with English partial translation).

* cited by examiner

Fig.4

| DEVICE ID | STATE PARAMETER 1 | STATE PARAMETER 2 | STATE PARAMETER 3 | STATE PARAMETER 4 | ... | STATE PARAMETER N |
|---|---|---|---|---|---|---|
| | | | | | | |
| | | | | | | |
| | | | | | | |
| | | | | | | |
| | | | | | | |
| | | | | | | |
| | | | | | | |

*Fig.5*

| TYPE | SERIAL NUMBER | POSITION | PROCESS PROGRESS |
|---|---|---|---|
|  |  |  |  |
|  |  |  |  |
|  |  |  |  |
|  |  |  |  |
|  |  |  |  |
|  |  |  |  |
|  |  |  |  |
|  |  |  |  |

CONTROLLER FOR DISTRIBUTED DEVICES

CROSS-REFERENCE TO RELATED APPLICATION

This application is based upon and claims the benefit of priority from Japanese Patent Application No. 2019-214790, filed on Nov. 27, 2019, the entire contents of which are incorporated herein by reference.

BACKGROUND

Field

The present disclosure relates to a control system, a controller, and a control method for a plurality of distributed devices.

Description of the Related Art

Japanese Unexamined Patent Application Publication No. 2018-153881 discloses a control system including a first controller, a second controller, and a third controller. The third controller includes a first communication unit and a second communication unit. The third controller further comprises a control processing unit configured to: output a first operation command for operating the first control object to the first controller by the first communication unit; output a second operation command for operating the second control object to the second controller by the second communication unit; acquire information about the present position of the first control object from the first controller by the first communication unit; and correct the second operation command based on the information about the present position of the first control object.

SUMMARY

Disclosed herein is an example control system. The control system may include: a plurality of controllers configured to control a plurality of devices respectively, the plurality of devices including at least one robot; and an environment manager communicable with the plurality of controllers. The environment manager may include environment circuitry configured to update environment information stored in an environment information storage according to operations of the plurality of devices. Each of the plurality of controllers may include control circuitry. The control circuitry may be configured to: monitor whether the environment information stored in the environment information storage satisfies a predetermined condition; and control a corresponding device of the plurality of devices to execute a predetermined operation in response to at least determining that the environment information satisfies the predetermined condition.

Additionally, an example controller is disclosed herein. The controller may include control circuitry. The control circuitry may be configured to: monitor whether environment information updated according to operations of a plurality of devices satisfies a predetermined condition by an environment manager communicable with a plurality of controllers configured to control the plurality of devices respectively; and control a corresponding device of the plurality of devices to execute a predetermined operation in response to determining that the environment information satisfies the predetermined condition.

Additionally, an example control method is disclosed herein. The method may include monitoring whether environment information updated according to operation of a plurality of devices by an environment manager communicable with a plurality of controllers configured to control the plurality of devices respectively, satisfies a predetermined condition. The method may further include controlling a corresponding device of the plurality of the devices to perform a predetermined operation in response to determining that the environment information satisfies the predetermined condition.

BRIEF DESCRIPTION OF THE DRAWINGS

FIG. 4 is a table illustrating an example of device information.

FIG. 5 is a table illustrating an example of workpiece information.

DETAILED DESCRIPTION

Figure 1:
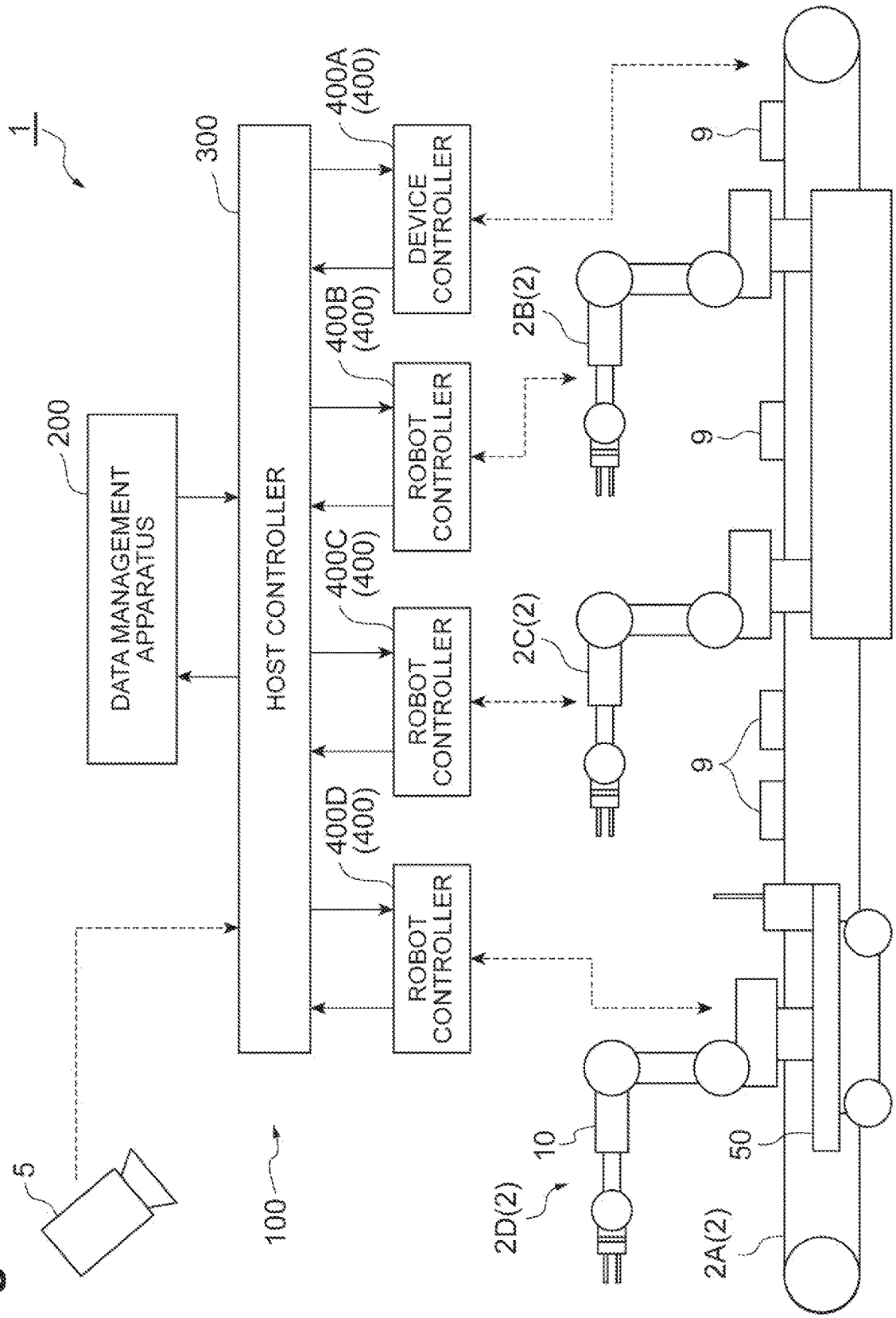
FIG. 1 is a schematic diagram illustrating an example configuration of a production system.

Hereinafter, with reference to the drawings, the same elements or similar elements having the same function are denoted by the same reference numerals, and redundant description will be omitted.

Production System

A production system 1 shown in FIG. 1 is a system for producing a workpiece by a collaborative operation of a plurality of distributed devices. Hereinafter, all objects to be handled by each device in a production process of a workpiece will be referred to as a "workpiece". For example, "workpiece" includes a final product of the production system 1, a part of the final product, a unit of a plurality of parts of the final product, and the like.

The collaborative operation may include the plurality of devices that operate to share a plurality of processes for obtaining at least one final product. The plurality of devices may operate to share a plurality of processes for obtaining one final product or may operate to share a plurality of process sets for obtaining a plurality of final products.

The production system 1 includes a plurality of distributed devices 2 and a control system 100. Each of the devices 2 is a device that directly performs an operation on the workpiece 9, and that is located at the production site of the workpiece 9. The direct operation is, for example, an operation for applying some energy such as thermal energy, kinetic energy, or potential energy to the workpiece 9.

The plurality of devices 2 may include one or more robots, and in some examples, at least one device 2 is a robot. The plurality of devices 2 shown in FIG. 1 includes, but is not limited to, a conveying device 2A, robots 2B, 2C, and a mobile robot 2D. The number and type of devices 2 may vary for different examples.

The conveying device 2A conveys the workpiece 9 by power of, for example, an electric motor. Specific examples of the conveying device 2A include a belt conveyor and a roller conveyor. The robots 2B and 2C and the mobile robot 2D perform an operation on the workpiece 9 conveyed by the conveying device 2A. Specific examples of the operation on the workpiece 9 include assembly of a workpiece 9 which is for example sub-part to another workpiece 9 which is for example a base part conveyed by the conveying device 2A, and fastening (for example, bolt fastening) and joining (for example, welding) of parts in a workpiece 9 conveyed by the conveying device 2A.

Figure 2:
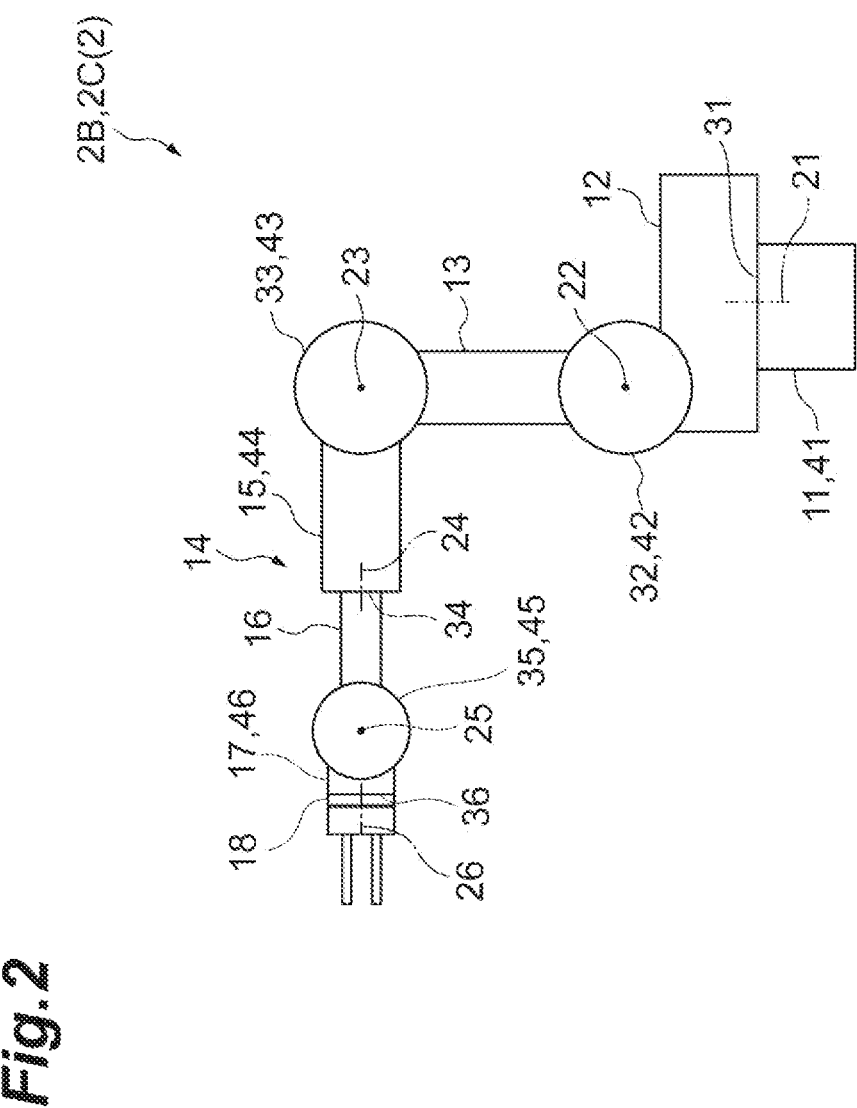
FIG. 2 is a schematic diagram illustrating an example configuration of a robot.

For example, each of the robots 2B and 2C is a 6-axis vertical articulated robot, and as shown in FIG. 2, includes a base 11, a turning portion 12, a first arm 13, a second arm 14, a third arm 17, a tip portion 18, and actuators 41, 42, 43, 44, 45, and 46. The base 11 is installed around the conveying device 2A. The turning portion 12 is provided on the base 11 to be rotatable about a vertical axis 21. The first arm 13 is connected to the turning portion 12 to be swingable about an axis 22 that intersects (e.g., is orthogonal to) the axis 21. The intersection includes a case in which there is a twisted relationship such as a so-called three dimensional intersection. The second arm 14 is connected to the distal end of the first arm 13 to be swingable about an axis 23 substantially parallel to the axis 22. The second arm 14 includes an arm base 15 and an arm end 16. The a in base 15 is connected to the distal end of the first arm 13 and extends along an axis 24 that intersects (e.g., is orthogonal to) the axis 23. The arm end 16 is connected to the distal end of the arm base 15 to be rotatable about the axis 24. The third arm 17 is connected to the distal end of the arm end 16 to be swingable about an axis 25 intersecting (e.g., orthogonal to) the axis 24. The tip portion 18 is connected to the distal end of the third arm 17 to be rotatable about an axis 26 that intersects (e.g., is orthogonal to) the axis 25.

Thus, the robots 2B and 2C have a joint 31 connecting the base 11 and the turning portion 12, a joint 32 connecting the turning portion 12 and the first arm 13, a joint 33 connecting the first arm 13 and the second arm 14, a joint 34 connecting the arm base 15 and the arm end 16 in the second arm 14, a joint 35 connecting the arm end 16 and the third arm 17, and a joint 36 connecting the third arm 17 and the tip portion 18.

The actuators 41, 42, 43, 44, 45, and 46 include, for example, an electric motor and a speed reducer, and are configured to drive the joints 31, 32, 33, 34, 35, and 36, respectively. For example, an actuator 41 is configured to rotate the turning portion 12 about the axis 21, an actuator 42 is configured to swing the first arm 13 about the axis 22, an actuator 43 is configured to swing the second arm 14 about the axis 23, an actuator 44 is configured to rotate the arm end 16 about the axis 24, an actuator 45 is configured to swing the third arm 17 about the axis 25, and an actuator 46 is configured to rotate the tip 18 portion about the axis 26.

The specific configuration of the robots 2B and 2C can be modified. For example, the robots 2B and 2C may be 7-axis redundant robots in which one axis joint is further added to the 6-axis vertical articulated robots, or may be so-called SCARA articulated robots.

Returning to FIG. 1, the mobile robot 2D is an autonomously movable robot. The mobile robot 2D includes a robot 10 configured similarly to the robots 2B and 2C, and an automated guided vehicle 50. The automated guided vehicle 50 travels autonomously to convey the robot 10.

The production system 1 may further comprise an external sensor 5. The external sensor 5 detects the state of an operation environment of the plurality of devices 2 (hereinafter referred to as "environmental status"). A specific example of the external sensor 5 is a camera that captures an image of the operation environment of the plurality of devices 2. The external sensor 5 may be a sensor that detects the presence or absence of the workpiece 9 at a predetermined position by laser light or the like, or may be a sensor that detects the size or the like of the workpiece 9. The production system 1 may comprise a plurality of external sensors 5. For example, the production system 1 includes external sensors 5a and 5b. The external sensor 5a is a sensor such as a limit switch that outputs an ON/OFF signal. The external sensor 5b is a sensor such as a camera that outputs a set of data.

Control System

The control system 100 includes an environment manager 110 and a plurality of distributed controllers 400. The plurality of controllers 400 are configured to control the plurality of devices 2, respectively.

In FIG. 1, the control system 100 includes four controllers 400A, 400B, 400C, and 400D. A controller 400A controls the conveying device 2A, a controller 400B controls the robot 2B, a controller 400C controls the robot 2C, and a controller 400D controls the mobile robot 2D. The number of controllers 400 and the configuration of each of the controllers 400 can be changed according to the number of devices 2 and the type of each of the devices 2.

The environment manager 110 is configured to output a command (e.g., a production start command, a production stop command, etc.) to at least one controller 400, and is configured to acquire status information of the plurality of devices 2 from the plurality of controllers 400. The environment manager 110 may also be configured to acquire the detection result from the external sensor 5. A specific example of the environment manager 110 includes a programmable logic controller configured to operate according to a ladder program.

The environment manager 110 is in wired or wireless communication with the plurality of controllers 400 and is configured to update environment information in response to operation of the plurality of devices 2. For example, the environment manager 110 is configured to perform synchronous communication with the plurality of controllers 400 and to update the environment information in a communication cycle of the synchronous communication. Here, synchronous communication may include communication with the plurality of controllers 400 that is performed every one period of the communication cycle synchronized with a synchronization frame having a predetermined period. The environment manager 110 may be configured to perform predetermined processing on the sensor information acquired from the external sensor 5 (e.g., image processing on the image information acquired from the external sensor 5b) and to update the environment information further based on a result of the processing.

The environment manager 110 may comprise a plurality of devices. For example, the environment manager 110 includes environment circuitry. In some examples, the environment manager 110 includes a data management apparatus 200 and a host controller 300. The host controller 300 is configured to perform synchronous communication with a plurality of controllers 400 and updates the environment information in a communication cycle of the synchronous communication. The data management apparatus 200 is configured to perform predetermined processing on the sensor information acquired from the external sensor 5, and the host controller 300 is further configured to update the environment information based on the processing result of the sensor information by the data management apparatus 200. The data management apparatus 200 may be configured to perform synchronous or asynchronous communication with the host controller 300 in a cycle longer than the communication cycle of the synchronous communication between the host controller 300 and the plurality of controllers 400.

Figure 3:
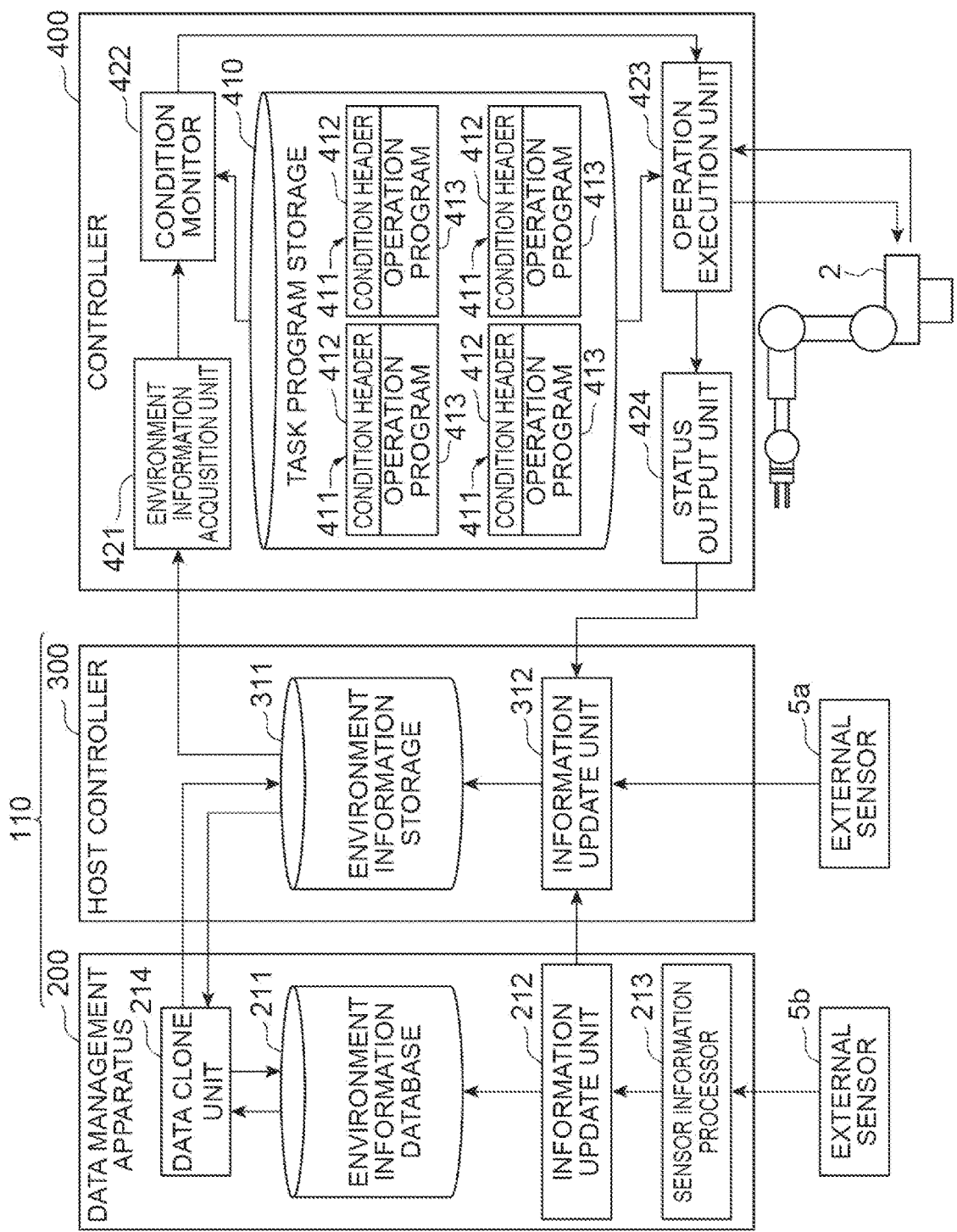
FIG. 3 is a block diagram illustrating an example functional configuration of a data management apparatus and a controller.

For example, as shown in FIG. 3, the host controller 300 includes an environment information storage 311 and an information update unit 312 as a functional element (hereinafter referred to as "functional block"). The environment information storage 311 and the information update unit 312 constitute an environment circuitry. The environment information storage 311 is configured to store the environment information.

The environment information includes, for example, information on the device 2 (hereinafter referred to as "device information"), and information on the workpiece 9 (hereinafter, referred to as "workpiece information"). A specific example of the device information includes the position/posture information of the device 2. Specific examples of the position/posture information of the device 2 include posture information of the robots 2B and 2C and position/posture information of the mobile robot 2D. The posture information of the robots 2B, 2C may be operation angular information of the joints 31, 32, 33, 34, 35, 36 or position/posture information of the tip portion 18. The position/posture information of the mobile robot 2D includes, for example, position/posture information of the automated guided vehicle 50 and posture information of the robot 10. The posture information of the robot 10 may be operation angle information of the joints 31, 32, 33, 34, 35, 36 or position/posture information of the tip portion 18 (position/posture with respect to the automated guided vehicle 50).

FIG. 4 is a table illustrating an example of the device information. In FIG. 4, identification information of the device 2 is associated with at least one state parameter indicating information on the device 2.

Specific examples of the workpiece information include position information of each workpiece 9 in the conveying device 2A and process progress information of each workpiece 9. The process progress information is, for example, information indicating up to which step of all steps until the final product is completed.

Figure 5:
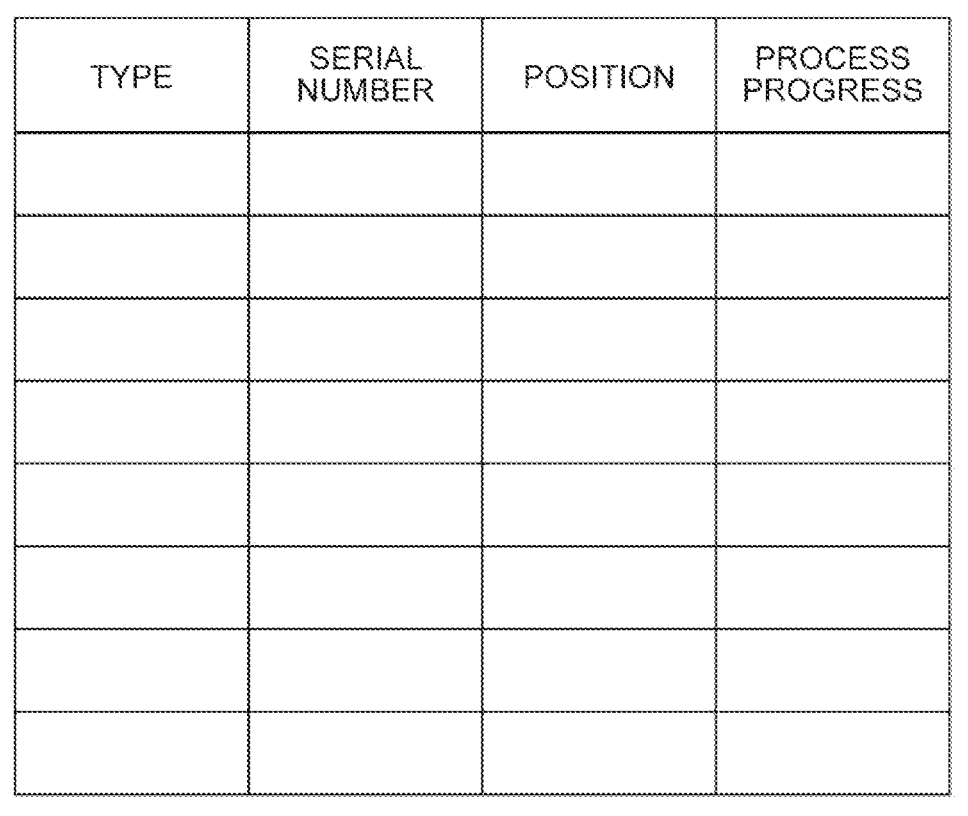

FIG. 5 is a table illustrating an example of the workpiece information. In FIG. 5, identification information (for example, type and serial number) of the workpiece 9, position information of the workpiece 9, and process progress information of the workpiece 9 are associated with each other.

Returning to FIG. 3, the information update unit 312 is configured to update the environment information in the environment information storage 311 according to the operation of the plurality of devices 2. For example, the information update unit 312 is configured to acquire status information of the device 2 from each of the plurality of controllers 400 in each period of the synchronous communication, and to update the device information based on the status information. As a result, the status information of the plurality of devices 2 can be reflected in the environment information in a mutually synchronized state. The information update unit 312 may further be configured to update the workpiece information based on the status information of the device 2. For example, the information update unit 312 may further be configured to update the position information of each workpiece 9 based on the status information of the conveying device 2A acquired from the controller 400A.

The status information may include operation content information indicating which operation the device 2 has executed. Specific examples of the operation content information include information indicating according to which program the controller 400 operates the device 2. The information update unit 312 may further be configured to update process progress information of the operation-target workpiece 9 based on the operation content information.

The information update unit 312 may further be configured to update the environment information based on the detection result of the external sensor 5. For example, the information update unit 312 may further be configured to update the environment information based on a signal output from the external sensor 5b. By aggregating the detection result of the external sensor 5 in the environment information of the host controller 300, the detection result of the external sensor 5 and the status information of the plurality of devices 2 can be reflected in the environment information along one common time line.

The data management apparatus 200 includes, as functional blocks, an environment information database 211, an information update unit 212, a sensor information processor 213, and a data clone unit 214. An environment information database 211 is configured to store a log of the environment information stored in the environment information storage 311. For example, the environment information database 211 is configured to store multiple sets of environment information stored in the environment information storage 311 in chronological order.

The data clone unit 214 is configured to match the latest environment information in the environment information database 211 to the environment information in the environment information storage 311. For example, the data clone unit 214 is configured to acquire the environment information from the environment information storage 311 in a case where the environment information of the environment information storage 311 is updated in the host controller 300, and to store it in the environment information database 211 as the latest environment information. The data clone unit 214 may further be configured to acquire the environment information stored in the environment information database 211 and to store it in the environment information storage 311.

The sensor information processor 213 is configured to perform predetermined processing on the sensor information acquired from the external sensor 5. Specific examples of the predetermined processing include processing for extracting workpiece information such as the type, position, and posture of the workpiece, device information such as the position of the robot and the operation state of the robot, and an approach method of the end effector to the workpiece (composite information of the workpiece information and the device information) based on the image information acquired from the external sensor 5b and the sensor information acquired from the other external sensor 5.

The information update unit 212 is configured to update the latest environment information in the environment information database 211 based on the processing result of the sensor information processor 213. The information update unit 212 is further configured to output the processing result of the sensor information processor 213 to the information update unit 312 of the host controller 300. In response, the information update unit 312 updates the environment information in the environment information storage 311 based on the processing result of the sensor information processor 213.

Each of the plurality of the controllers 400 is configured to perform monitoring whether the environment information updated according to the operation of the plurality of devices 2 in the host controller 300 satisfies the predetermined condition, and to control a corresponding device 2 of the plurality of devices 2 to perform a predetermined operation in a case where the environment information satisfies the predetermined condition. Each of the plurality of the controllers 400 is a so-called edge device disposed near the plurality of devices 2. Each of the plurality of the controllers 400 includes control circuitry. For example, each of the plurality of controllers 400 includes, as functional blocks, a task program storage 410, an environment information acquisition unit 421, a condition monitor 422, an operation execution unit 423, and a status output unit 424.

The task program storage 410 is configured to store at least one task program 411. The task program 411 includes a condition header 412 and an operation program 413. The operation program 413 represents an operation of a corresponding device 2 of the plurality of devices. For example, the operation program 413 includes a plurality of motion commands arranged in time series so as to control the device 2 to execute a group of operations. For example, each of the plurality of motion commands in the operation program 413 of the robots 2B, 2C and the mobile robot 2D includes the target position and the target posture of the tip portion 18.

The condition header 412 represents an execution condition of the operation program 413. The execution condition is a condition to be satisfied by the environment information in order to execute the operation program 413. Specific examples of the execution condition include the following.

Example 1

An adjacent device 2 is not located within the operation range of the corresponding device 2 associated with execution of operation program 413.

Example 2

The workpiece 9 to be handled is arranged at a position where the operation of the corresponding device 2 according to the operation program 413 can be executed.

The execution condition may be a combination of Examples 1 and 2. The workpiece 9 to be subjected to the operation is, for example, the workpiece 9 on which the operation is not executed and another operation immediately before the operation is completed.

The task program storage 410 may store a plurality of task programs 411, and each of the plurality of task programs 411 may include a condition header 412 and an operation program 413.

The environment information acquisition unit 421 is configured to acquire the environment information stored in the environment information storage 311 of the host controller 300. The environment information acquisition unit 421 may further be configured to request the host controller 300 to output the environment information and acquire the environment information output in response to the request, or may further be configured to acquire the environment information output from the host controller 300 in the synchronous communication, regardless of the presence or absence of the request.

The condition monitor 422 is configured to monitor whether the environment information acquired by the environment information acquisition unit 421 satisfies a predetermined condition. For example, the condition monitor 422 is configured to monitor whether the execution condition of the task program 411 is satisfied based on the environment information acquired by the environment information acquisition unit 421 and the condition header 412 of the task program 411.

For example, in a case where the execution condition of Example 1 is defined by the condition header 412, the condition monitor 422 may further be configured to extract the position/posture information of an adjacent device 2 from the environment information, and to monitor whether the adjacent device 2 is located within the operation range of the corresponding device 2 based on the extracted information. If the adjacent device 2 is not located within the operation range of the corresponding device 2, the condition monitor 422 may determine that the execution condition of Example 1 is satisfied.

In a case where the execution condition of Example 2 is defined by the condition header 412, the condition monitor 422 may further be configured to extract information on the position of the workpiece 9 conveyed by the conveying device 2A and process progress information of the workpiece 9 from the environment information, and to monitor whether or not the workpiece 9 to be subjected to the operation is arranged at a position where the operation can be executed based on the extracted information. In a ease where the workpiece 9 to be subjected to the operation is arranged at the position where the operation can be executed, the condition monitor 422 may determine that the execution condition of Example 2 is satisfied.

In a case where the task program storage 410 stores the plurality of task programs 411, the condition monitor 422 may monitor whether the environment information satisfies the execution condition of each of the plurality of task programs 411 based on the environment information acquired by the environment information acquisition unit 421 and the condition header 412 of each of the plurality of task programs 411.

The operation execution unit 423 is configured to control the corresponding device 2 to execute a predetermined operation in a case where the environment information satisfies the predetermined condition. For example, in a case where the environment information satisfies the execution condition of the task program 411 in a monitor result by the condition monitor 422, the operation execution unit 423 may operate the corresponding device 2 based on the operation program of the task program 411.

In a case where the task program storage 410 is configured to store the plurality of task programs 411, the operation execution unit 423 may further be configured to operate the corresponding device 2 based on the operation program of a task program 411 of the plurality of task programs 411 in a case where the environment information satisfies the execution condition of the task program 411 in the monitor result by the condition monitor 422.

The status output unit 424 is configured to output the status information of the corresponding device 2 to the host controller 300. As described above, the status information includes at least the position/posture information of the corresponding device 2, and may further include operation content information (information indicating which operation has been executed by the corresponding device 2).

The status output unit 424 may further be configured to derive the process progress information (information indicating up to which step of all the steps until the final product is completed) of the workpiece 9 to be subjected to the operation based on the operation content information, and to output the derived process progress information included in the status information. In this case, it is not necessary for the information update unit 312 of the host controller 300 to derive the process progress information based on the operation content information.

The status output unit 424 may further be configured to output status information in response to a request from the host controller 300 in the synchronous communication, or may further be configured to output status information regardless of the presence or absence of a request from the host controller 300.

An example control executed by the control system 100, including a plurality of the controllers 400, will be described below. In this example, in the environment information of the environment information storage 311, a set of information referred to by the condition monitor 422 of the controller 400B is referred to as "first information", another set of information referred to by the condition monitor 422 of the controller 400C is referred to as "second information", and a set of information referred to by the condition monitor 422 of the controller 400D is referred to as "third information". Each of the first information, the second information, and the third information includes at least the workpiece information.

For example, the operation execution unit 423 of the controller 400A (first controller) is configured to control the conveying device 2A to convey the workpiece 9. The status output unit 424 of the controller 400A is configured to output status information of the conveying device 2A.

The information update unit 312 is configured to update the workpiece information according to the operation of the conveying device 2A. As a result, the first information, the second information, and the third information are updated. For example, the information update unit 312 is configured to update the position information of each workpiece 9 in the conveying device 2A based on the status information of the conveying device 2A.

The condition monitor 422 of each of the controllers 400B, 400C, and 400D is configured to monitor whether the workpiece information satisfies a predetermined condition, and the operation execution unit 423 of each of the controllers 400B, 400C, and 400D is configured to control the corresponding device 2 to execute a predetermined operation in a case where the workpiece information satisfies the predetermined condition. For example, the condition monitor 422 of the controller 400B (second controller) is configured to monitor whether the first information satisfies the following condition.

(Condition 1-1)

The workpiece 9 to be subjected to a first operation of the robot 2B according to a first operation program 413 is arranged at a position where the first operation can be executed.

In a case where the first information satisfies the condition 1-1, the operation execution unit 423 of the controller 400B controls the robot 2B to execute the first operation for the workpiece 9. The status output unit 424 of the controller 400B outputs status information of the robot 2B during and/or after executing the first operation.

The condition monitor 422 of the controller 400C (third controller) is configured to monitor whether the second information satisfies the following condition.

(Condition 1-2)

The workpiece 9 to be subjected to a second operation according to a second operation program 413 is arranged at a position where the second operation can be executed.

In a case where the second information satisfies the condition 1-2, the operation execution unit 423 of the controller 400C controls the robot 2C to execute the second operation for the workpiece 9. The status output unit 424 of the controller 400C outputs status information of the robot 2C during and/or after executing the second operation.

The condition monitor 422 of the controller 400D (fourth controller) is configured to monitor whether the third information satisfies the following condition.

(Condition 1-3)

The workpiece 9 to be subjected to a third operation according to a third operation program 413 is arranged at a position where the third operation can be executed.

While the position of the workpiece 9 is represented by the first coordinate system, which is a coordinate system based on the conveying device 2A, the position at which the robot 10 can perform an operation may be represented by the second coordinate system, which is a coordinate system based on the automated guided vehicle 50. In such a case, the condition monitor 422 may further be configured to perform coordinate transformation from the first coordinate system to the second coordinate system on the position of the workpiece 9 and monitor whether the position of the workpiece 9 in the second coordinate system satisfies the condition 1-3.

In a case where the third information satisfies the condition 1-3, the controller 400D controls the mobile robot 2D to execute the third operation for the workpiece 9. The status output unit 424 of the controller 400D outputs status information of the mobile robot 2D during and/or after the third operation. In response, the information update unit 312 updates the device information of the mobile robot 2D (the second information).

The information update unit 312 is configured to update device information and workpiece information according to operations of the robots 2B, 2C and the mobile robot 2D. For example, the information update unit 312 is configured to update the device information of the robot 2B based on the status information output by the status output unit 424 of the controller 400B, and updates the workpiece information (process progress information) of the workpiece 9 to be operated on by the robot 2B. The information update unit 312 is further configured to update the device information of the robot 2C based on the status information output by the status output unit 424 of the controller 400C, and to update the workpiece information (process progress information) of the workpiece 9 to be operated on by the robot 2C. The information update unit 312 is further configured to update the device information of the mobile robot 2D based on the status information output by the status output unit 424 of the controller 400D, and to update the workpiece information (process progress information) of the workpiece 9 to be operated on by the mobile robot 2D.

The first information may further include device information of a device 2 adjacent to the robot 2B (e.g., the robot 2C). In this case, the condition monitor 422 of the controller 400B may be further configured to monitor whether the first information satisfies the following condition.

(Condition 2-1)

The robot 2C is not located within the operation range of the robot 2B according to the first operation program 413.

In a case where the first information satisfies the condition 1-1 and the condition 2-1, the operation execution unit 423 of the controller 400B controls the robot 2B to execute the first operation for the workpiece 9.

The second information may further include device information of a device 2 adjacent to the robot 2C (e.g., the robot 2B and the mobile robot 2D). In this case, the condition monitor 422 of the controller 400C may further be configured to monitor whether the second information satisfies the following condition.

(Condition 2-2)

The robot 2B and the mobile robot 2D are not located within the operation range of the robot 2C according to the second operation program 413.

In a case where the second information satisfies the condition 1-2 and the condition 2-2, the operation execution unit 423 of the controller 400C controls the robot 2C to execute the second operation for the workpiece 9.

The third information may further include device information of a device 2 adjacent to the mobile robot 2D (e.g., the robot 2C). In this case, the condition monitor 422 of the controller 400D may further be configured to monitor whether the third information satisfies the next condition.

(Condition 2-3)

The robot 2C is not located within the operation range of the mobile robot 2D according to the third operation program 413.

In a case where the third information satisfies the condition 1-3 and the condition 2-3, the operation execution unit 423 of the controller 400D controls the mobile robot 2D to execute the third operation for the workpiece 9.

The information update unit 312 may further be configured to update the first information based on a detection result of the external sensor 5. In this case, the condition monitor 422 of the controller 400B may further be configured to monitor whether the sensor related information updated based on the detection result of the external sensor 5 satisfies a first sensor condition, and the operation execution unit 423 of the controller 400B may further be configured to control the robot 2B to execute the first operation in a case where the sensor related information satisfies the first sensor condition.

The information update unit 312 may further be configured to update the second information based on a detection result of the external sensor 5. In this case, the condition monitor 422 of the controller 400C may further be configured to monitor whether the sensor related information updated based on the detection result of the external sensor 5 satisfies a second sensor condition, and the operation execution unit 423 of the controller 400C may further be configured to control the robot 2C to execute the second operation in a case where the sensor related information satisfies the second sensor condition.

The information update unit 312 may further be configured to update the third information based on a detection result of the external sensor 5. In this case, the condition monitor 422 of the controller 400D may further be configured to monitor whether the sensor related information updated based on the detection result of the external sensor 5 satisfies a third sensor condition, and the operation execution unit 423 of the controller 400D may further be configured to control the mobile robot 2D to execute the third operation in a case where the sensor related information satisfies the third sensor condition.

Figure 6:
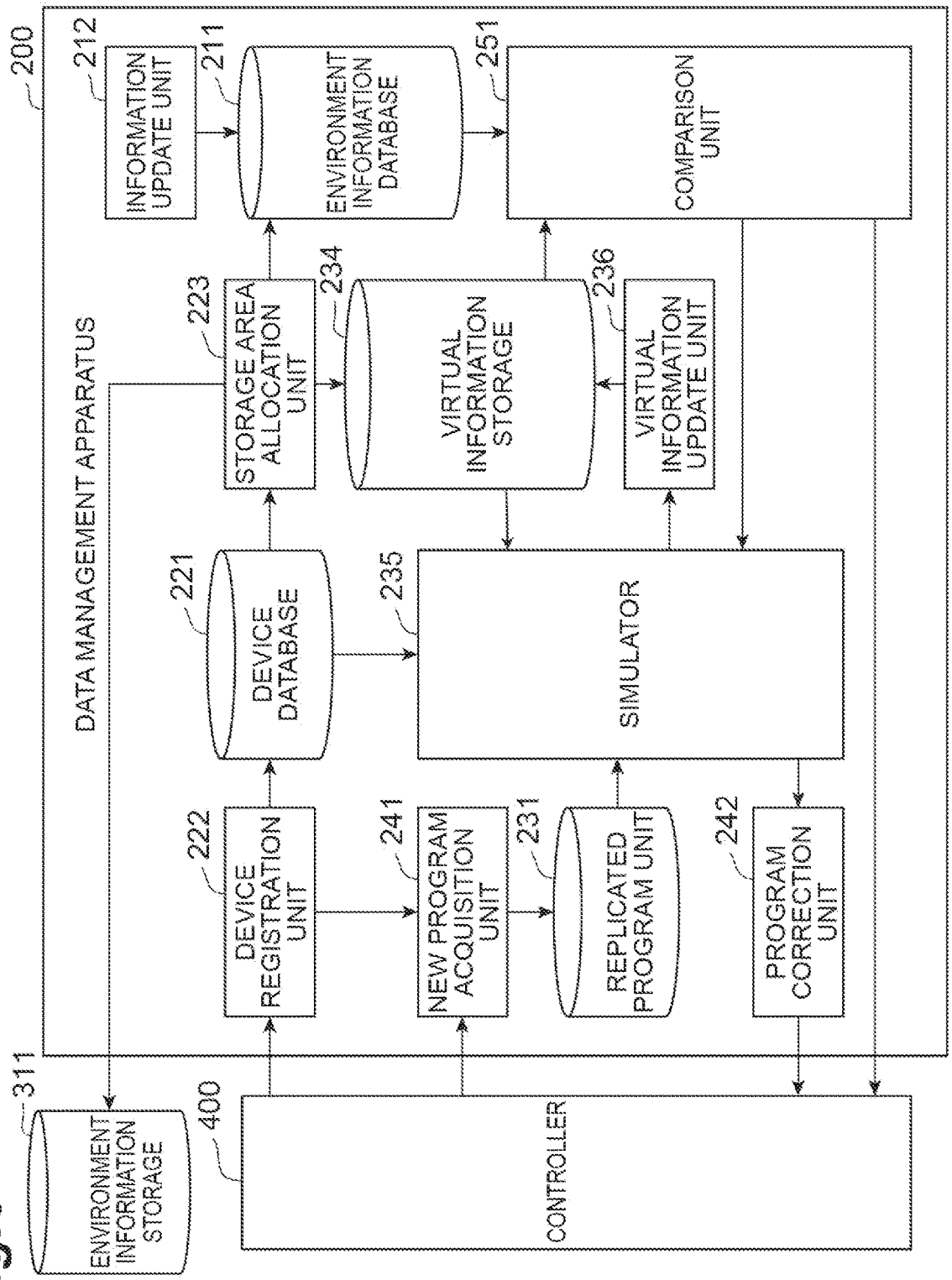
FIG. 6 is a block diagram showing another example configuration of the data management apparatus.

The environment manager 110 may further be configured to: register information on the new device 2 in a device database; and allocate a storage area of new information based on a status information of the new device 2 collected from a new controller 400 of the new device 2 in the environment information storage 311. For example, as shown in FIG. 6, the data management apparatus 200 may further include a device database 221, a device registration unit 222, and a storage area allocation unit 223 as functional blocks.

The device database 221 is configured to store information about the plurality of devices 2. The information on the device 2 includes, for example, identification information of the device 2, type information of the device 2, model information of the device 2, and the like. The model information of the device 2 includes information on a structure of the device 2 and dimensions of each part of the device 2. The device registration unit 222 is configured to acquire information on a new device 2 from a new controller 400 of the new device 2 and registers the information in the device database 221. The device registration unit 222 may further be configured to acquire information about the new device 2 from the new controller 400 via the host controller 300.

The storage area allocation unit 223 is configured to allocate a storage area of new information based on the status information of the new device 2 collected from the new controller 400 in the environment information database 211 and the environment information storage 311 of the host controller 300. For example, the storage area allocation unit 223 is further configured to set a data format of the new information based on a content of the status information of the new device 2, and to allocate the storage area of the new information in the environment information database 211 and the environment information storage 311 according to the set data format. The new controller 400 may set the data format.

The data management apparatus 200 may be further configured to: monitor, based on a virtual environment information and the condition header of the task program, whether an execution condition of the task program is satisfied; if the execution condition of the task program is satisfied, perform simulation (simulated operation) of the corresponding device 2 based on the operation program of the task program; and update the virtual environment information according to the operation of the corresponding device 2 in the simulation. For example, the data management apparatus 200 may further include, as functional blocks, a replicated program storage 231, a virtual information storage 234, a simulator 235, and a virtual information update unit 236.

The replicated program storage 231 is configured to store task programs for each of the plurality of devices 2 (e.g., a replica of the plurality of task programs stored in the task program storage 410). The virtual information storage 234 is configured to store the virtual environment information. The virtual environment information has the same data structure as the data structure of the environment information. The storage area allocation unit 223 may further be configured to allocate a storage area for the new information based on the status information of the new device 2 collected from the new controller 400 in the virtual information storage 234.

The simulator 235 is configured to monitor whether the virtual environment information satisfies the execution condition of the task program based on the virtual environment information and the condition header of the task program, and to perform simulation (simulated operation) of the corresponding device 2 based on the operation program of the task program in a case where the virtual environment information satisfies the execution condition of the task program. For example, in a case where the virtual environment information satisfies the execution condition of the task program of the conveying device 2A, the simulator 235 may operate the model of the conveying device 2A in a simulation space based on the operation program of the task program and the model information of the conveying device 2A stored in the device database 221.

In a case where the virtual environment information satisfies the execution condition of the task program of the robot 2B, the simulator 235 may operate the model of the robot 2B in the simulation space based on the operation program of the task program and the model information of the robot 2B stored in the device database 221.

In a case where the virtual environment information satisfies the execution condition of the task program of the robot 2C, the simulator 235 may operate the model of the robot 2C in the simulation space based on the operation program of the task program and the model information of the robot 2C stored in the device database 221.

In a case where the virtual environment information satisfies the execution condition of the task program of the mobile robot 2D, the simulator 235 may operate the model of the mobile robot 2D in the simulation space based on the operation program of the task program and the model information of the mobile robot 2D stored in the device database 221.

The virtual information update unit 236 is configured to update the virtual environment information of the virtual information storage 234 according to the operation of the plurality of devices 2 in the simulation by the simulator 235. The data management apparatus 200 is configured to simulate the operations of the plurality of devices 2 by the plurality of controllers 400 by repeating the simulation by the simulator 235 and the update of the virtual environment information by the virtual information update unit 236.

The data management apparatus 200 may further be configured to: acquire, from the new controller 400 of the new device 2, a new task program that includes an operation program that represents an operation of the new device 2 and a condition header that represents an execution condition in response to addition of the new device 2; and perform simulation of the new device 2 by the new controller 400 based on the new task program and execute correction of the new task program based on a result of the simulation. For example, the data management apparatus 200 may further include a new program acquisition unit 241 and a program correction unit 242 as functional blocks.

The new program acquisition unit 241 is configured to acquire, as a new device 2 is added, a new task program including a new operation program representing the operation of the new device 2 and a new condition header representing an execution condition of the new operation program from the new controller 400 of the new device 2 and stores it in the replicated program storage 231. The new program acquisition unit 241 may further be configured to acquire the new task program from the new controller 400 via the host controller 300.

The program correction unit 242 is configured to control the simulator 235 to perform a simulation of the new device 2 by the new controller 400 based on the new task program acquired by the new program acquisition unit 241, and to correct the new task program based on the result of the simulation. For example, the program correction unit 242 is configured to repeat the simulation by the simulator 235 and the update of the virtual environment information by the virtual information update unit 236 after the new task program is stored in the virtual information storage 234 by the new program acquisition unit 241, thereby simulating the operation of the plurality of devices 2 including the new device 2 and correcting the new task program based on the result of the simulation.

For example, the program correction unit 242 is configured to check whether there is interference between the model of the new device 2 (e.g., robot) and the models of the existing devices 2 (e.g., robots 2B, 2C, and mobile robot 2D), and to correct, if there is interference, the new task program to avoid the interference. As an example, the program correction unit 242 is further configured to correct the new condition header so as to expand the operation range of the new device 2 according to the new operation program of the new task program. The program correction unit 242 may further be configured to correct the new operation program of the new task program so as to avoid the interference. The program correction unit 242 may further be configured to correct the new task program stored in the replicated program storage 231. Additionally, the program correction unit 242 may further be configured to output the new task program after the correction to the new controller 400 of the new device 2, and to correct the new task program in the task program storage 410 of the new controller 400.

The data management apparatus 200 may further be configured to detect an irregularity in the production system 1 based on a comparison between the latest environment information stored in the environment information database 211 and the virtual environment information stored in the virtual information storage 234. For example, the data management apparatus 200 may further include a comparison unit 251.

The comparison unit 251 is configured to match the state of the plurality of devices 2 in the real space with the state of the model of the plurality of devices 2 in the simulation space, and to cause the simulator 235 to simulate the operation of the plurality of devices 2 in synchronization with the operation of the plurality of devices 2 by the plurality of controllers 400. For example, the comparison unit 251 may further be configured to repeat the simulation by the simulator 235 and the update of the virtual environment information by the virtual information update unit 236 in synchronization with the operation of the plurality of devices 2 by the plurality of controllers 400. The comparison unit 251 may further be configured to detect an irregularity of the production system 1 in a case where there is a difference between the latest environment information stored in the environment information database 211 and the virtual environment information stored in the virtual information storage 234.

Figure 7:
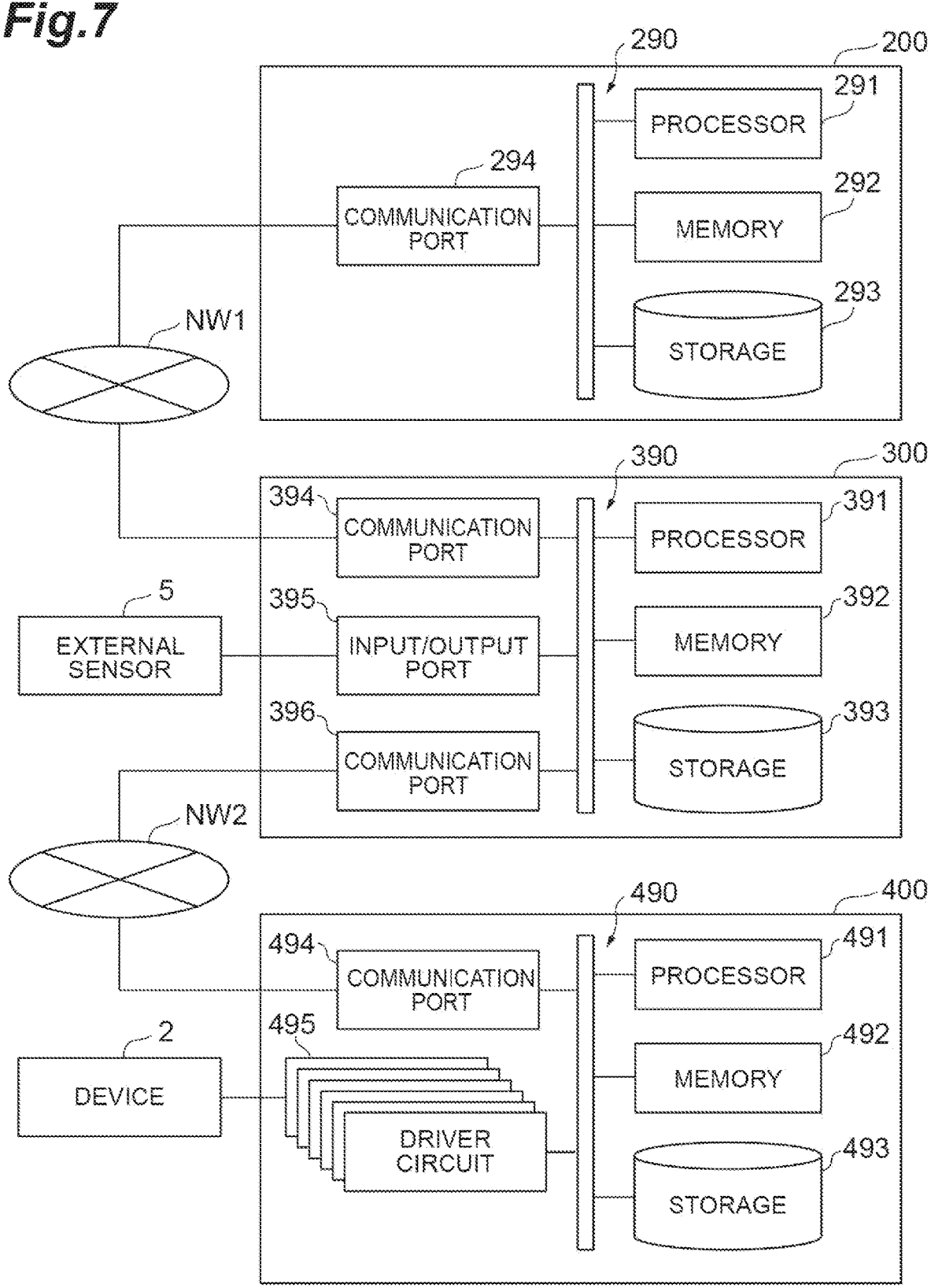
FIG. 7 is a block diagram illustrating an example hardware configuration of a control system.

FIG. 7 is a block diagram illustrating an example hardware configuration of the control system 100. As shown in FIG. 7, the data management apparatus 200 includes circuitry 290. The circuitry 290 includes one or more processors 291, a memory 292, storage 293, and a communication port 294. The storage 293 includes a computer-readable storage medium such as a nonvolatile semiconductor memory. The storage 293 stores a program for causing the data management apparatus 200 to update the environment information according to the operation of a plurality of devices 2. For example, the storage 293 stores a program for configuring the above-described functional blocks of the data management apparatus 200.

The memory 292 temporarily stores a program loaded from the storage medium of the storage 293 and an operation result of the one or more processors 291. The one or more processors 291 execute the program in cooperation with the memory 292 to configure the above-described functional blocks of the data management apparatus 200. The communication port 294 communicates with the host controller 300 via the first network NW1 in accordance with an instruction from the one or more processors 291.

The host controller 300 includes circuitry 390. The circuitry 390 includes one or more processors 391, a memory 392, storage 393, communication port 394, input/output port 395, and communication port 396. The storage 393 includes a computer-readable storage medium such as a nonvolatile semiconductor memory. The storage 393 stores a program for causing the host controller 300 to output a command to at least one controller 400, acquire status information of the plurality of devices 2 from the plurality of controllers 400, and acquire the detection result by the external sensor 5.

The memory 392 temporarily stores a program loaded from the storage medium of the storage 393 and an operation result of the one or more processors 391. The one or more processors 391 execute the program in cooperation with the memory 392 to configure the above-described functional blocks of the host controller 300. The communication port 394 communicates with the data management apparatus 200 via the first network NW1 in accordance with an instruction from the one or more processors 391. The input/output port 395 inputs and outputs information to and from the external sensor 5 in accordance with an instruction from the one or more processors 391. The communication port 396 communicates with the plurality of controllers 400 via the second network NW2 in accordance with an instruction from the one or more processors 391.

The controller 400 includes circuitry 490. The circuitry 490 includes one or more processors 491, a memory 492, storage 493, a communication port 494, and one or more driver circuits 495. The storage 493 includes a computer-readable storage medium such as a nonvolatile semiconductor memory. The storage 493 stores a program for causing the controller 400 to perform: monitoring whether environment information updated according to an operation of a plurality of devices 2 in the data management apparatus 200 satisfies a predetermined condition; and controlling a corresponding device 2 of the plurality of devices 2 to perform a predetermined operation in a case where the environment information satisfies the predetermined condition. For example, the storage 493 stores a program for configuring the above-described functional blocks of the controller 400.

The memory 492 temporarily stores a program loaded from the storage medium of the storage 493 and an operation result of the one or more processors 491. The one or more processors 491 execute the program in cooperation with the memory 492 to configure the above-described functional blocks of the controller 400. The communication port 494 communicates with the host controller 300 via the second network NW2 in accordance with an instruction from the one or more processors 491. The one or more driver circuits 495 output driving power to the device 2 in accordance with a command from the one or more processors 491.

It should be noted that the circuitry 290, 390, 490 is not necessarily limited to the configuration in which each function is configured by a program. For example, at least a part of the functions of the circuitry 290, 390, 490 may be configured by a dedicated logic circuit or an application specific integrated circuit (ASIC) in which the dedicated logic circuit is integrated.

The configuration of the control system 100 described above is merely an example, and can be modified. For example, the data management apparatus 200 may be incorporated in the host controller 300. The plurality of controllers 400 may also be incorporated into the host controller 300. The control system 100 may further include another controller that controls another device of the plurality of devices 2.

Control Sequence

As an example of the control method, a control sequence executed by the control system 100 will be described. This procedure includes an update procedure of the environment information executed by the data management apparatus 200, a control sequence of the device 2 executed by the controller 400, a task program correction procedure executed by the data management apparatus 200, and an irregularity detection procedure executed by the data management apparatus 200. Hereinafter, each procedure will be described in detail.

Update Procedure of Environment Information

Figure 8:
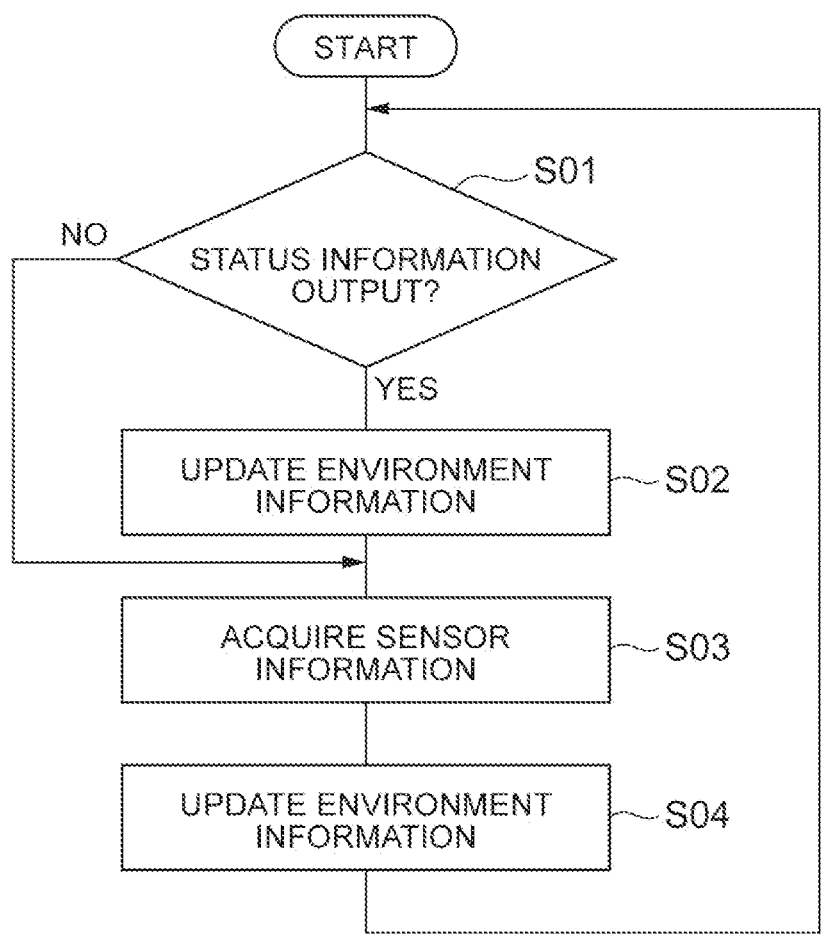
FIG. 8 is a flowchart illustrating an example update procedure of environment information.

This procedure includes updating the environment information based on the status information and updating the environment information based on the detection result by the external sensor 5. As shown in FIG. 8, the data management apparatus 200 executes operation S01. In operation S01, the information update unit 312 checks whether any of the controllers 400 outputs status information.

If it is determined in operation S0I that any of the controllers 400 outputs status information, the data management apparatus 200 executes operation S02. In operation S02, the information update unit 312 acquires the output status information, and updates the device information of the environment information storage 311 based on the status information.

Next, the data management apparatus 200 executes operation S03. If it is determined in operation S01 that no controller 400 outputs status information, the data management apparatus 200 executes operation S03 without executing operation S02. In operation S03, the information update unit 312 acquires a detection result from the external sensor 5. The information update unit 212 also acquires the processing result by the sensor information processor 213.

Next, the data management apparatus 200 executes operation S04. In operation S04, the information update unit 212 updates at least the workpiece information or the device information based on the detection result by the external sensor 5 and the processing result by the sensor information processor 213. The data management apparatus 200 repeats the above procedure.

Control Sequence of Device

Figure 9:
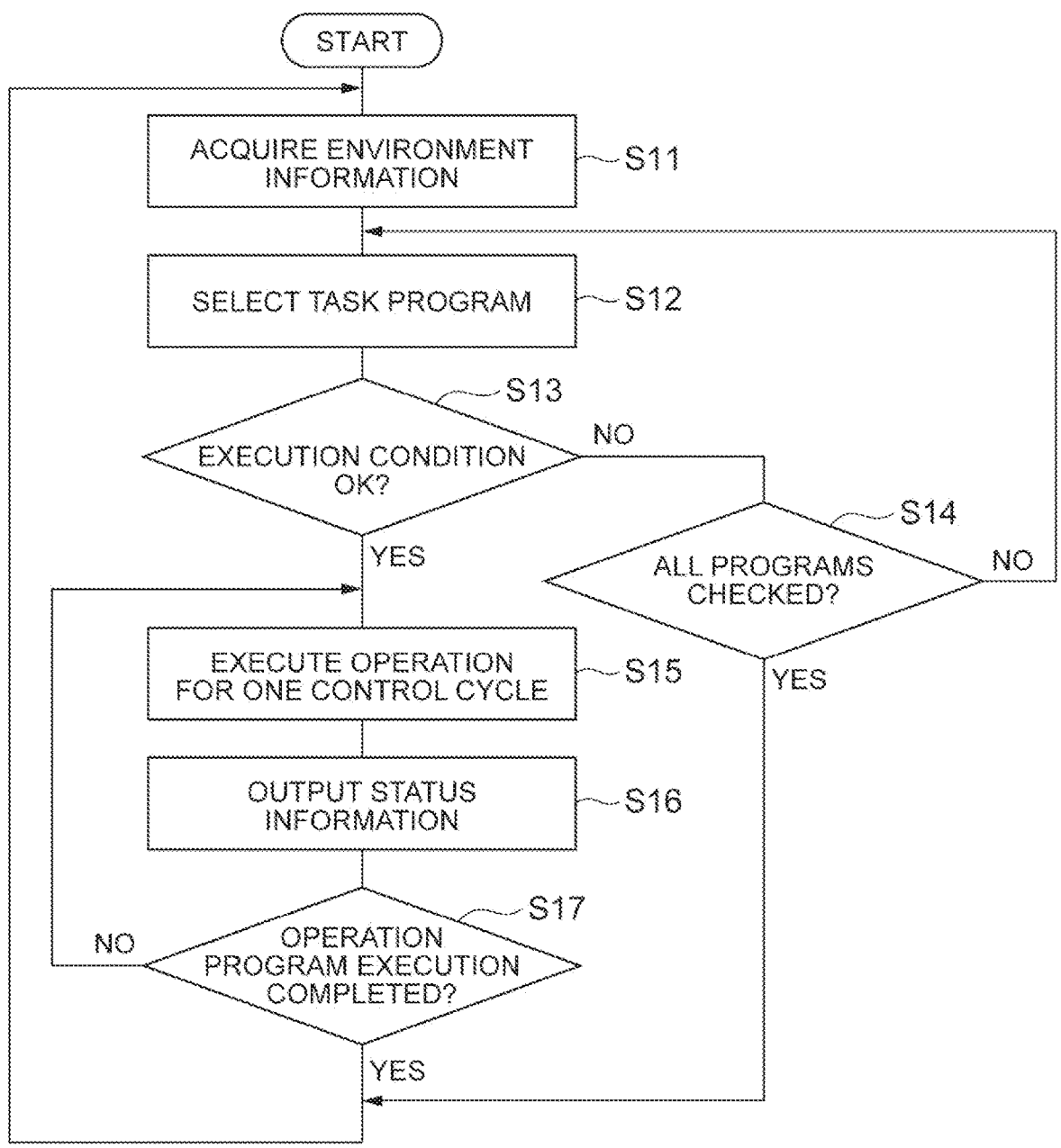
FIG. 9 is a flowchart illustrating an example control sequence of the device.

As shown in FIG. 9, the controller 400 executes operations S11, S12, and S13. In operation S11, the environment information acquisition unit 421 acquires the environment information stored in the environment information storage 311 of the host controller 300. In operation S12, the condition monitor 422 selects one of the plurality of task programs stored in the task program storage 410. In operation S13, the condition monitor 422 checks whether the environment information acquired in operation S11 satisfies the execution condition of the task program selected in operation S12.

If it is determined in operation S13 that the environment information does not satisfy the execution condition of the task program, the controller 400 executes operation S14. In operation S14, the condition monitor 422 checks whether the execution condition has been checked (whether the execution condition is satisfied) for all the task programs in the task program storage 410.

If it is determined in operation S14 that a task program whose execution condition has not been checked remains, the controller 400 returns the processing to operation S12.

Thereafter, the selection of the task program and the confirmation of the execution condition are repeated until it is determined in operation S13 that the execution condition of the task program is satisfied or until it is determined in operation S14 that the confirmation of the execution condition has been performed for all the task programs.

If it is determined in operation S13 that the environment information satisfies the execution condition of the task program, the controller 400 executes operations S15, S16, and S17. In operation S15, the operation execution unit 423 controls the corresponding device 2 to execute an operation for one control cycle in accordance with an active program which is the operation program of the task program 411 in which the execution condition is satisfied. In operation S16, the status output unit 424 outputs the status information of the corresponding device 2 to the data management apparatus 200. In operation S17, the operation execution unit 423 checks whether the operation of the corresponding device 2 based on the active program is completed.

If it is determined in operation S17 that the operation of the corresponding device 2 based on the active program is not completed, the controller 400 returns the processing to operation S15. Thereafter, until the execution of the active program is completed, the operation for one control cycle according to the active program is repeatedly executed by the corresponding device 2 and the status information of the device 2 of the control object is repeatedly output to the data management apparatus 200.

If it is determined in operation S17 that the operation of the device 2 based on the active program is completed, the controller 400 returns the processing to operation S11. If it is determined in operation S14 that the execution condition has been checked for all the task programs, the controller 400 returns the processing to operation S11 without executing operations S15, S16, and S17. The controller 400 repeats the above control sequence.

Task Program Correction Procedure

The task program correction procedure includes: registering information about a new device 2 in the device database; allocating a storage area of new information based on status information of the new device 2 collected from a new controller 400 of the new device 2 in the environment information storage 311; acquiring, from the new controller 400, a new task correct program including an operation program representing operation of the new device 2 and a condition header representing an execution condition; and performing a new simulation of the new device 2 by the new controller 400 based on the new task program.

Figure 10:
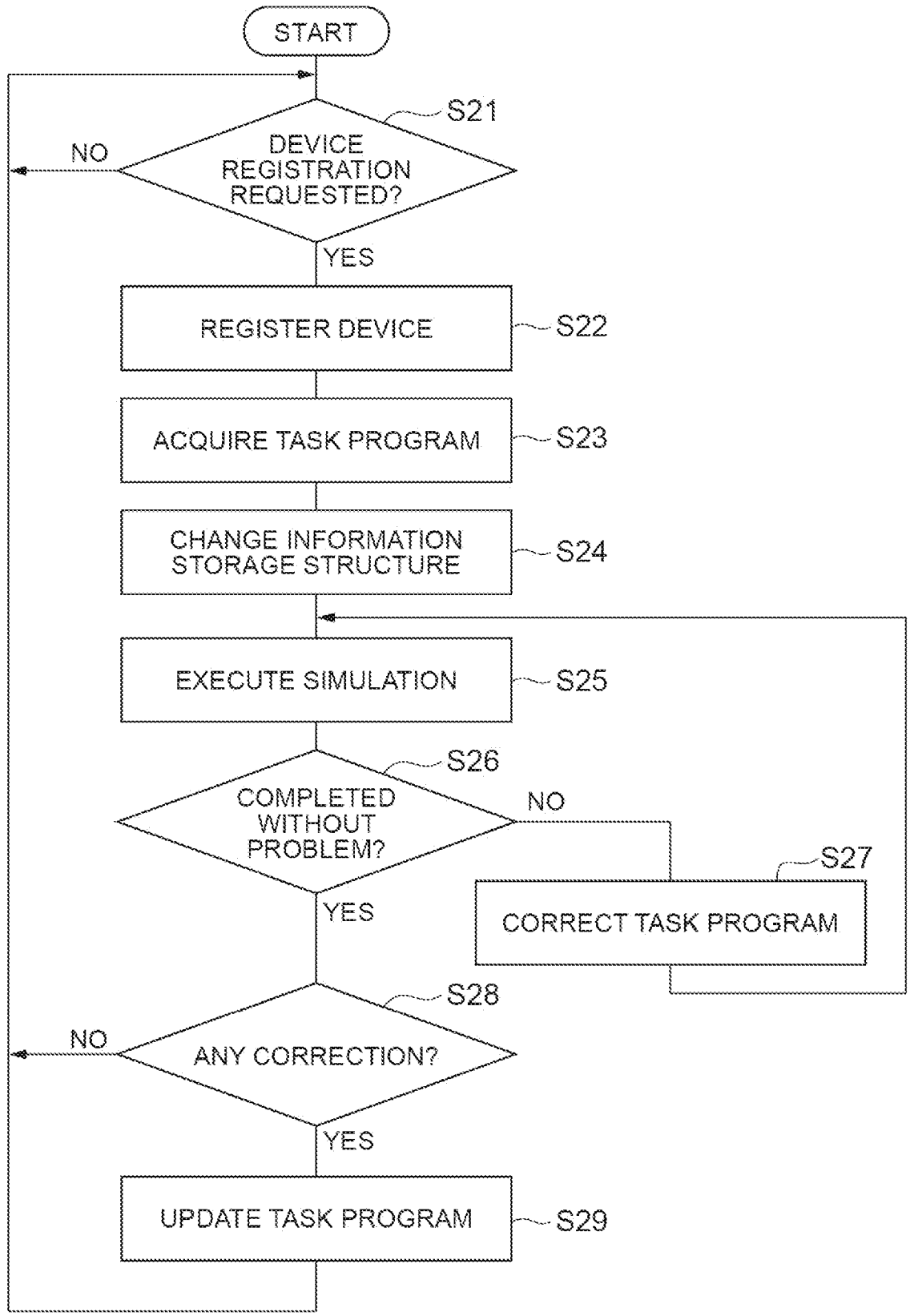
FIG. 10 is a flowchart illustrating an example task program correction procedure.

As shown in FIG. 10, the data management apparatus 200 first executes operations S21, S22, S23, S24, S25, and S26. In operation S21, the device registration unit 222 waits for the addition of a new device 2. For example, the device registration unit 222 waits for a register request of the new device 2 to be output from the new controller 400 of the new device 2.

In operation S22, the device registration unit 222 acquires information on the new device 2 from the new controller 400 and registers the information in the device database 221. If a plurality of new devices 2 are added simultaneously, the device registration unit 222 acquires and registers information about the plurality of new devices 2.

In operation S23, as the new device 2 is added, the new program acquisition unit 241 acquires a new task program including a new operation program representing the operation of the new device 2 and a new condition header representing an execution condition of the new operation program from the new controller 400, and stores the new task program in the replicated program storage 231. If a plurality of new devices 2 are added simultaneously, the new program acquisition unit 241 acquires and stores new task programs of the plurality of new devices 2.

In operation S24, the storage area allocation unit 223 allocates a storage area of new information based on the status information of the new device 2 collected from the new controller 400 in the environment information storage 311, the environment information database 211, and the virtual information storage 234. For example, the storage area allocation unit 223 sets the data format of the new information based on the content of the status information, and allocates the storage area of the new information in the environment information storage 311, the environment information database 211, and the virtual information storage 234 according to the set data format. The content of the status information is recognized by the storage area allocation unit 223, for example, based on the new task program.

In operation S25, for example, the program correction unit 242 simulates the operation of the plurality of devices 2 including the new device 2 by repeating the simulation by the simulator 235 and the update of the virtual environment information by the virtual information update unit 236. In operation S26, the program correction unit 242 checks whether there is a problem in the simulation result in operation S25.

If it is determined in operation S26 that the simulation result has a problem, the data management apparatus 200 executes operation S27. In operation S27, the program correction unit 242 corrects the new task program in the replicated program storage 231 based on the simulation result. Thereafter, the data management apparatus 200 returns processing to operation S26. Thereafter, the simulation and the correction of the new task program are repeated until a problem-free simulation result is obtained.

If it is determined in operation S26 that the simulation result has no problem, the data management apparatus 200 executes operation S28. In operation S28, the program correction unit 242 checks whether the new task program in the replicated program storage 231 has been corrected.

If it is determined in operation S28 that the new task program has been corrected, the data management apparatus 200 executes operation S29. In operation S29, the program correction unit 242 outputs the new task program corrected in the replicated program storage 231 to the new controller 400 of the new device 2 to update the task program in the task program storage 410 of the new controller 400. Thereafter, the data management apparatus 200 returns the processing to operation S21. If it is determined in operation S28 that the new task program has not been corrected, the data management apparatus 200 returns the processing to operation S21 without executing operation S27. The data management apparatus 200 repeats the above procedure.

Figure 11:
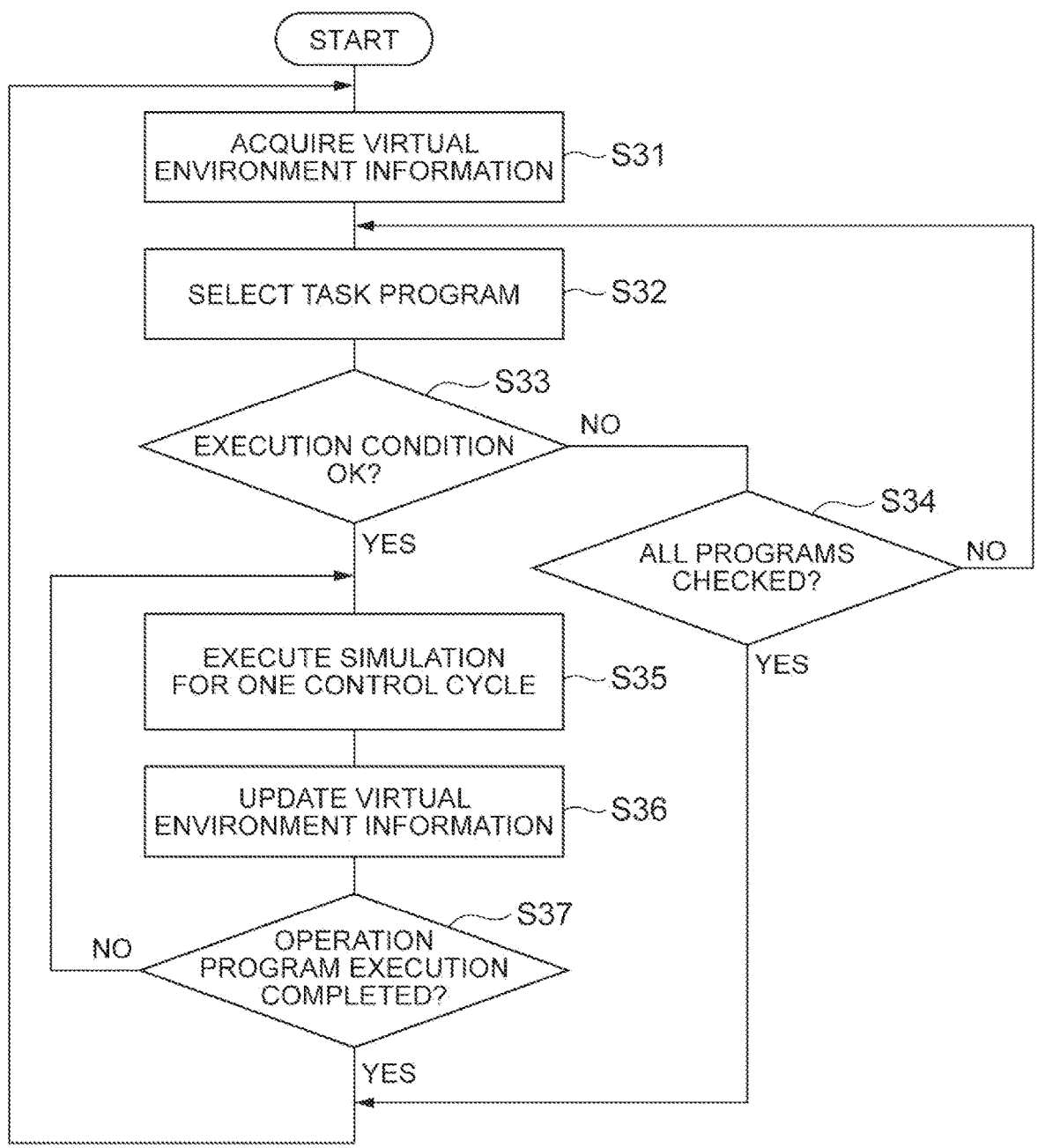
FIG. 11 is a flowchart illustrating an example simulation procedure.

FIG. 11 is a flowchart illustrating an example simulation procedure executed by the data management apparatus 200 for each device 2 in the simulation of operation S25. As shown in FIG. 11, the data management apparatus 200 executes operations S31, S32, and S33. In operation S31, the simulator 235 acquires virtual environment information stored in the virtual information storage 234.

In operation S32, the simulator 235 selects one of the subject task programs that are a plurality of task programs stored in the replicated program storage 231 in association with the device 2 to be simulated. Hereinafter, the task program selected by the simulator 235 is referred to as a selected task program. In operation S33, the simulator 235 checks whether the virtual environment information acquired in operation S31 satisfies the execution condition of the selected task program selected in operation S32.

If it is determined in operation S33 that the virtual environment information does not satisfy the execution condition of the selected task program, the data management apparatus 200 executes operation S34. In operation S34, the simulator 235 checks whether the execution condition has been checked for all the subject task programs.

If it is determined in operation S34 that a task program whose execution condition has not been checked remains, the data management apparatus 200 returns the processing to operation S32. Thereafter, the selection of any one of the subject task programs and the confirmation of the execution condition are repeated until it is determined in operation S32 that the execution condition of the selected task program is satisfied or until it is determined in operation S34 that the confirmation of the execution condition has been performed for all the subject task programs.

If it is determined in operation S33 that the virtual environment information satisfies the execution condition of the selected task program, the data management apparatus 200 executes operations S35, S36, and S37. In operation S35, the simulator 235 executes simulation for one control cycle on the device 2 to be simulated in accordance with an active program that is the operation program of the selected task program in which the execution condition is satisfied.

In operation S36, the virtual information update unit 236 updates the virtual environment information in the virtual information storage 234 based on the simulation result. In operation S37, the simulator 235 checks whether the operation of the device 2 based on the active program is completed.

If it is determined in operation S37 that the operation of the device 2 based on the active program is not completed, the controller 400 returns the processing to operation S35. Thereafter, until the execution of the active program is completed, the execution of the simulation for one control cycle according to the active program and the update of the virtual environment information based on the simulation result are repeated.

If it is determined in operation S37 that the operation of the device 2 based on the active program is completed, the data management apparatus 200 returns the processing to operation S31. If it is determined in operation S34 that the execution condition has been checked for all the target programs, the data management apparatus 200 returns the processing to operation S31 without executing operations S35, S36, and S37. The data management apparatus 200 repeats the above procedure.

Irregularity Detection Procedure

Figure 12:
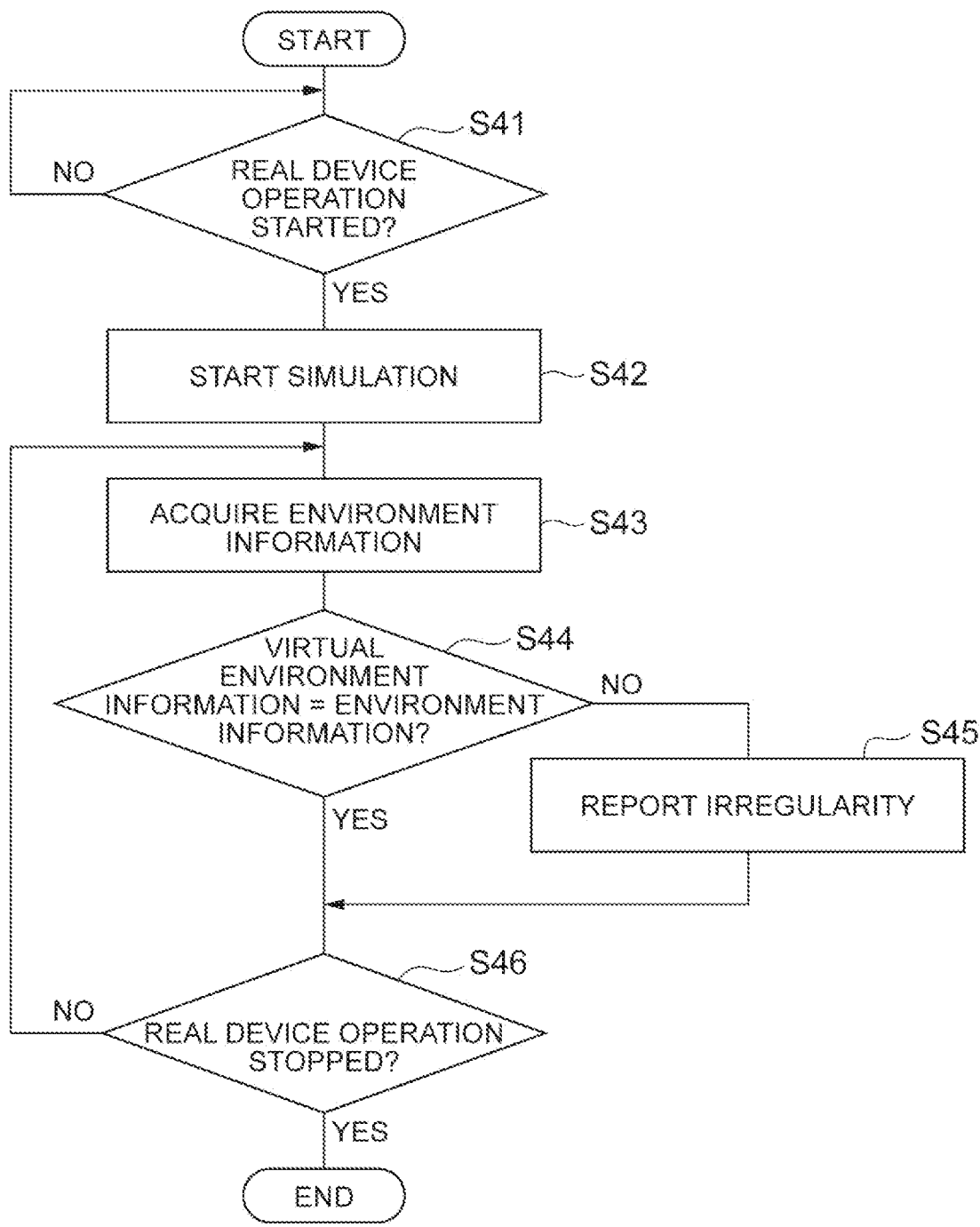
FIG. 12 is a flowchart illustrating an example irregularity detection procedure.

The irregularity detection procedure includes detecting an irregularity in the production system 1 based on a comparison of the environment information and the virtual environment information. As shown in FIG. 12, the data management apparatus 200 executes operations S41, S42. In operation S41, the comparison unit 251 matches the state of the model of the plurality of devices 2 in the simulation space with the state of the plurality of devices 2 in the real space, and waits for the plurality of controllers 400 to start the operation of the plurality of devices 2. In operation S42, the comparison unit 251 starts simulation by the simulator 235. Thereafter, the simulation by the simulator 235 and the update of the virtual environment information by the virtual information update unit 236 are repeated according to the simulation procedure for each device 2 described above.

In parallel with this, the data management apparatus 200 executes operations S43, S44. In operation S43, the comparison unit 251 acquires the latest environment information stored in the environment information database 211. In operation S44, the comparison unit 251 checks whether the virtual environment information in the virtual information storage 234 is identical to the environment information acquired in operation S43.

If it is determined in operation S44 that the virtual environment information is not identical to the environment information, the data management apparatus 200 executes operation S45. In operation S45, the comparison unit 251 reports an irregularity. For example, the comparison unit 251 displays the irregularity notification screen on a display device such as a monitor.

Next, the data management apparatus 200 executes operation S46. If it is determined in operation S44 that the virtual environment information is identical to the environment information, the data management apparatus 200 executes operation S46 without executing operation S45. In operation S46, it is checked whether or not the plurality of devices 2 have stopped operating by the plurality of controllers 400.

If it is determined in operation S46 that the plurality of devices 2 have not stopped operating, the data management apparatus 200 returns processing to operation S43. Thereafter, the simulation by the simulator 235, the update of the virtual environment information by the virtual information update unit 236, the acquisition of the environment information, and the comparison between the virtual environment information and the environment information are continued until the plurality of devices 2 stops operating. If it is determined in operation S46 that the plurality of devices 2 has stopped operating, the irregularity detection procedure is completed.

As described above, the control system 100 includes a plurality of controllers 400 configured to control a plurality of devices 2 respectively, the plurality of devices 2 including one or more robots 2B, 2C, 10, and the environment manager 110 communicable with the plurality of controllers 400. The environment manager 110 includes the environment information storage 311 that stores environment information and the information update unit 312 configured to update the environment information according to the operation of the plurality of devices 2. Each of the plurality of controllers 400 includes the condition monitor 422 configured to monitor whether the environment information stored in the environment information storage 311 satisfies a predetermined condition and the operation execution unit 423 configured to control a corresponding device 2 of the plurality of devices 2 to execute a predetermined operation in a case where the environment information satisfies a predetermined condition.

In a control system that outputs an operation command from a host controller to a plurality of controllers that respectively control a plurality of devices 2, a complicated program is constructed in the host controller in order to coordinate the plurality of devices. Therefore, when one or more devices are added or changed, program modification in the host controller becomes complicated. In contrast, according to the control system 100 in which each of the plurality of controllers 400 includes the condition monitor 422 and the operation execution unit 423, the corresponding device 2 and other devices 2 are autonomously coordinated in each controller 400. Therefore, it is not necessary to construct a complicated program in the host controller 300. Complicated program modification accompanying the addition/change of a device 2 is not required. Therefore, the control system 100 may be adapted to the addition/change of a device 2. This is also effective in reducing the information processing load on the host controller 300.

Each of the plurality of controllers 400 may further include the status output unit 424 that outputs the status information of the corresponding device 2 to the environment manager 110, and the information update unit 312 may update the environment information based on the status information acquired from each of the plurality of controllers 400. In this case, the status information from the controller 400 may be effectively used to update the environment information.

The plurality of devices 2 may include a first device and a second device, the plurality of controllers 400 may include a first controller 400A configured to control the first device and a second controller 400B configured to control the second device, the information update unit 312 may update first information of the environment information according to an operation of the first device, the condition monitor 422 of the second controller 400B monitors whether the first information satisfies a predetermined first condition, and the operation execution unit 423 of the second controller 400B may control the second device to execute a predetermined operation in a case where the first information satisfies the first condition. In this case, the second device and the first device cooperate autonomously in the second controller 400B.

The first device may be the conveying device 2A configured to convey a workpiece 9, and the second device may be the robot 2B configured to perform an operation on the workpiece 9 conveyed by the conveying device 2A. In this case, the robot 2B and the conveying device 2A are autonomously coordinated in the second controller 400B. Therefore, the conveying device 2A may be used as a pacemaker to manage the tact time of the entire autonomous system.

The plurality of devices 2 may further include the second robot 2C configured to perform an operation on the workpiece conveyed by the conveying device 2A, the plurality of controllers 400 may further include the third controller 400C configured to control the second robot 2C, the information update unit 312 may update second information of the environment information according to operations of the conveying device 2A and the robot 2B, the condition monitor 422 of the third controller 400C may monitor whether the second information satisfies a predetermined second condition, and the operation execution unit 423 of the third controller 400C may control the second robot 2C to execute a predetermined second operation in a case where the second information satisfies the second condition. In this case, cooperation between robots configured to operate in accordance with an operation of the conveying device 2A as a pacemaker may be achieved.

The robot may be the autonomously movable mobile robot 2D. The second robot may be the autonomously movable mobile robot 2D. The environment manager 110 may be in wireless communication with at least one or more of the plurality of controllers 400.

The environment manager 110 may be configured to perform synchronous communication with the plurality of controllers 400, and the information update unit 312 may update the environment information in synchronization with a communication cycle of the synchronous communication. In this case, the environment information may be updated in synchronization with a communication cycle required for control. As the environment information is updated in synchronization with the communication cycle as described above, the plurality of controllers 400 may be synchronized.

The control system 100 may further comprise the external sensor 5 configured to detect an environmental status, the environment manager 110 may further comprise the sensor information processor 213 configured to perform predetermined processing on sensor information acquired from the external sensor 5, and the information update unit 312 may update the environment information further based on the processing result by the sensor information processor 213. In this case, the plurality of controllers 400 may share the environment information by processing the environment information, and the system may be and flexibly constructed.

The environment manager 110 may have a host controller 300 comprising the environment information storage 311 and the information update unit 312, and configured to perform the synchronous communication with the plurality of controllers 400, and the data management apparatus 200 comprising the sensor information processor 213 and configured to perform synchronous communication or asynchronous communication with the host controller 300 in a cycle longer than a communication cycle of the synchronous communication. In this case, for example, components such as a programmable controller, a motion controller, and a sequencer can be used as the host controller 300, a large amount of data processing (processing with a large amount of data to be processed, processing with a long processing time) may be separated from the host controller 300, and the data management apparatus 200 having computational power corresponding to the large amount of data processing may be employed. According to the configuration, the system may be constructed inexpensively. In addition, isolation of heavy processing from the host controller 300 responsible for synchronization between the plurality of controllers 400 may ensure reliability of synchronization.

The data management apparatus 200 may further include the environment information database 211 configured to store a log of the environment information stored in the environment information storage 311. In this case, by storing the log of the environment information, the cause of an irregularity at the time of occurrence of the irregularity and collect data for improving the operation may be traced.

Each of the plurality of controllers 400 may further include a task program storage 410 that stores a task program 411 including an operation program 413 representing an operation of the corresponding device 2 and a condition header 412 representing an execution condition of the operation program, the condition monitor 422 may monitor whether an execution condition of the task program 411 is satisfied based on the environment information and the condition header 412 of the task program 411, and the operation execution unit 423 may operate the corresponding device 2 based on the operation program of the task program 411 in a case where the execution condition of the task program 411 is satisfied. In this case, a program for autonomous operation may be constructed by the register of the task program 411 in which the condition header 412 and the operation program 413 are associated with each other. Further, the program may be edited by separating the condition header 412 and the operation program 413. Furthermore, by using the condition header 412 and the operation program 413 as a set of task program 411, the program to another controller 400 or the like (for example, to modify and use the copied program) may be copied or reused. The task program 411 may be copied to a simulator.

The task program storage 410 may store a plurality of task programs 411 including the task program 411, each of the plurality of task programs 411 includes an operation program 413 representing an operation of the corresponding device 2 and a condition header 412 representing an execution condition of the operation program, the condition monitor 422 may determine whether an execution condition of each of the plurality of task programs 411 is satisfied based on the environment information and the condition header 412 of each of the plurality of task programs 411, and the operation execution unit 423 may control the corresponding device 2 based on the operation program of one of the plurality of the task programs the execution condition of which is satisfied. In this case, a program for executing a plurality of types of operations may be constructed according to the environment. Further, by adding or deleting the task program 411, type of operation may be extended or modified.

The environment manager 110 may include the device database 221 that stores information about the plurality of devices 2, the device registration unit 222 configured to register information on a new device 2 in the device database 221, and the storage area allocation unit 223 configured to, in response to registration of the new device, allocate a storage area of new information based on status information of the new device collected from a new controller 400 of the new device 2 in the environment information storage 311. In this case, the storage area of the environment information is automatically changed in response to the addition of the new device 2. Therefore, the addition of the new device 2 may be assisted.

The environment manager 110 may include the replicated program storage 231 that stores the task program of each of the plurality of controllers 400, the virtual information storage 234 that stores virtual environment information corresponding to the environment information, the simulator 235 configured to monitor whether the execution condition of the task program is satisfied based on the virtual environment information and the condition header of the task program, and perform simulation of the corresponding device 2 based on the operation program of the task program in a case where the execution condition of the task program is satisfied, and a virtual information update unit 236 configured to update the virtual environment information according to an operation of the plurality of devices in the simulation by the simulator 235. In this case, in addition to the simulation of the plurality of devices 2, the autonomous operation of the plurality of devices 2 may be simulated by simulating a change in the environment information according to the operation of the plurality of devices 2.

The environment manager 110 may include: the new program acquisition unit 241 configured to acquire a new task program from a new controller 400 of a new device 2, the new task program including a new operation program representing an operation of the new device 2 and a new condition header representing an execution condition of the new operation program in response to addition of the new device 2; and a program correction unit 242 configured to make the simulator 235 perform a new simulation of the new device 2 by the new controller 400 based on the new task program acquired by the new program acquisition unit 241, and correct the new task program based on a result of the simulation. In this case, the simulation result may be used for automatic adjustment of the task program.

The control system 100 may further include the external sensor 5 configured to detect an environmental status, and the information update unit 312 may update the environment information further based on a detection result of the external sensor 5. In this case, by using the external sensor 5, an environmental change may be more accurately grasped and reflected in the environment information.

In at least one of the plurality of controllers 400, the condition monitor 422 may monitor whether sensor related information of the environment information updated based on the detection result of the external sensor 5 satisfies the predetermined condition, and the operation execution unit 423 may control the corresponding device 2 to execute the predetermined operation in a case where the sensor related information satisfies the predetermined condition.

It is to be understood that not all aspects, advantages and features described herein may necessarily be achieved by, or included in, any one particular example embodiment. Indeed, having described and illustrated various examples herein, it should be apparent that other examples may be modified in arrangement and detail. We claim all modifications and variations coming within the spirit and scope of the subject matter claimed herein.

What is claimed is:

1. A control system comprising:
   a plurality of controllers configured to control, respectively, a plurality of devices performing operations in a shared operation environment, the plurality of devices including at least one robot; and
   an environment manager communicable with the plurality of controllers, the environment manager including environment circuitry configured to:
   store, on a shared database, environment information describing a status of the shared operation environment; and
   update the stored environment information on the shared database based on the operations of the plurality of devices,
   wherein at least one of the plurality of controllers comprises control circuitry configured to:
   monitor the shared database to detect a change in the stored environment information according to an operation executed by one device of the plurality of devices, other than the one robot, that is controlled by another controller in the shared operation environment;
   store a predetermined operating condition;
   compare the changed environment information with the predetermined operating condition; and
   control the one robot to execute a predetermined operation in response to at least determining that the changed environment information, caused by the operation executed by the one device controlled by the other controller, satisfies the predetermined operating condition.

2. The control system according to claim 1, wherein the control circuitry is further configured to output status information of the one robot to the environment manager, and
   wherein the environment circuitry is further configured to update the environment information based on the status information output from the control circuitry.

3. The control system according to claim 2, wherein the environment circuitry is further configured to:
   store information about the plurality of devices in a device database;
   register information on a new device in the device database; and
   allocate, in response to registration of the new device, a storage area of new information based on status information of the new device collected from a new controller of the new device in the environment information.

4. The control system according to claim 2, further comprising an external sensor configured to detect a status of the shared operation environment,
wherein the environment circuitry is further configured to update the environment information based on a detection result of the external sensor.

5. The control system according to claim 4, wherein the control circuitry is further configured to:
monitor whether sensor related information of the environment information updated based on the detection result of the external sensor satisfies the predetermined condition; and
control the one robot to execute the predetermined operation in response to determining that the sensor related information satisfies the predetermined condition.

6. The control system according to claim 1, wherein the plurality of devices include a first device and a second device,
wherein the plurality of controllers include a first controller configured to control the first device and a second controller configured to control the second device,
wherein the environment circuitry is further configured to update first information of the environment information based on an operation of the first device, and
wherein the second controller is configured to:
monitor a change in the first information according to the operation of the first device; and
control the second device to execute a predetermined operation in response to at least determining that the changed first information satisfies a predetermined first condition.

7. The control system according to claim 6, wherein the first device is a conveying device configured to convey a workpiece, and
wherein the second device is a robot configured to perform an operation on the workpiece conveyed by the conveying device.

8. The control system according to claim 7, wherein the plurality of devices further include a second robot configured to perform a second operation on the workpiece conveyed by the conveying device,
wherein the plurality of controllers further include a third controller configured to control the second robot,
wherein the environment circuitry is further configured to update second information of the environment information according to operations of the conveying device and the robot, and
wherein the third controller is further configured to:
monitor a change in the second information according to the operation of the robot; and
control the second robot to execute a predetermined second operation in response to at least determining that the changed second information satisfies a predetermined second condition.

9. The control system according to claim 1, wherein the environment manager wirelessly communicates with at least one or more of the plurality of controllers.

10. The control system according to claim 1, wherein the environment manager is configured to perform synchronous communication with the plurality of controllers, and
wherein the environment circuitry is further configured to update the environment information in synchronization with a communication cycle of the synchronous communication.

11. The control system according to claim 10, further comprising an external sensor configured to detect a status of the shared operation environment,
wherein the environment circuitry is further configured to:
perform predetermined processing on sensor information acquired from the external sensor to obtain a processing result, and
update the environment information further based on the processing result of the sensor information.

12. The control system according to claim 11, wherein the environment manager comprises:
a host controller configured to perform the synchronous communication with the plurality of controllers; and
a data management apparatus configured to perform synchronous or asynchronous communication with the host controller in a cycle longer than a communication cycle of the synchronous communication between the host controller and the plurality of controllers,
wherein the host controller comprises a first part of the environment circuitry configured to update the environment information based on the operations of the plurality of devices,
wherein the data management apparatus comprises a second part of the environment circuitry configured to obtain the processing result of the sensor information, and
wherein the first part of the environment circuitry is further configured to update the environment information based on the processing result of the sensor information.

13. The control system according to claim 12, wherein the second part of the environment circuitry is further configured to store a log of the environment information in an environment information database.

14. The control system according to claim 1, wherein the control circuitry is further configured to:
store a task program in a task program storage, the task program including an operation of the one robot and a condition header representing an execution condition of the operation; and
operate the one robot based on the operation of the task program in a case where the changed environment information satisfies the execution condition of the task program.

15. The control system according to claim 14, wherein the control circuitry is further configured to:
store a plurality of task programs including the task program, each of the plurality of task programs including the operation and the condition header; and
control the one robot based on the operation of one of the plurality of the task programs for which the execution condition is satisfied by the changed environment information.

16. The control system according to claim 14, wherein the environment circuitry is further configured to:
store the task program of each of the plurality of controllers in a replicated program storage;
monitor a change in a virtual environment information according to a simulation of the other device;
perform a simulation of the one robot based on the operation of the task program in a case where the virtual environment information satisfies the execution condition of the task program; and
update the virtual environment information based on simulated operations of the plurality of devices.

17. The control system according to claim 16, wherein the environment circuitry is further configured to:

acquire a new task program from a new controller of a new device, the new task program including a new operation of the new device and a new condition header representing an execution condition of the new operation in response to addition of the new device;

make the environment circuitry perform a new simulation of the new device by the new controller based on the new task program acquired from the new controller; and correct the new task program based on a result of the new simulation.

18. The control system according to claim 1, wherein the predetermined operating condition specifies that the one device must not be located within an operational range of the one robot in accordance with the predetermined operation, and wherein the at least one of the plurality of controllers is configured to control the one robot to execute the predetermined operation in response, at least in part, to determining that the one device is not within the operational range of the one robot in the changed environment information.

19. A control method comprising:

monitoring, by an environment manager communicable with a plurality of controllers, a shared operation environment in which a plurality of devices perform operations to generate environment information describing a status of the shared operation environment, wherein the plurality of devices includes a first robot controlled by a first robot controller and a second robot controlled by a second robot controller of the plurality of controllers;

storing, by the environment manager, the environment information on a shared database;

updating, by the environment manager, the environment information on the shared database based on the operations of the plurality of devices;

monitoring the shared database, by the second robot controller, to detect a change in the environment information according to an operation of the first robot which is controlled by the first robot controller in the shared operation environment;

storing, by the second robot controller, a predetermined operating condition; and controlling, by the second robot controller, the second robot to perform a predetermined operation in response to determining that the changed environment information satisfies the predetermined condition.

20. The method according to claim 19, wherein the plurality of devices include a first device controlled by a first device controller and a second device controlled by a second device controller of the plurality of controllers, and wherein the method further comprises:

updating, by the environment manager, first information of the environment information based on an operation of the first device;

monitoring, by the second device controller, a change in the first information according to the operation of the first device controlled by the first device controller; and controlling, by the second device controller, the second device to execute a predetermined operation in response to at least determining that the changed first information satisfies a predetermined first condition.

21. The method according to claim 19, wherein the predetermined operating condition specifies that the first robot must not be located within an operational range of the second robot in accordance with the predetermined operation, and wherein the second robot controller is configured to control the second robot to execute the predetermined operation in response, at least in part, to determining that the first robot is not within the operational range of the second robot in the changed environment information.

\* \* \* \* \*